Jan. 16, 1951 S. B. WILLIAMS 2,538,636

DIGITAL COMPUTER

Filed Dec. 31, 1947 27 Sheets-Sheet 1

INVENTOR
S. B. WILLIAMS
BY John A. Hall
ATTORNEY

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 3

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 4

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 5

INVENTOR
S. B. WILLIAMS
BY John A. Hall
ATTORNEY

INVENTOR
S. B. WILLIAMS
BY John A. Hall
ATTORNEY

DIGITAL COMPUTER

Filed Dec. 31, 1947 27 Sheets-Sheet 7

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 8

INVENTOR
S. B. WILLIAMS
BY John A. Hall
ATTORNEY

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 10

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 11

INVENTOR
S. B. WILLIAMS
BY John A. Hall
ATTORNEY

INVENTOR
S. B. WILLIAMS
BY John Hall
ATTORNEY

INVENTOR
S. B. WILLIAMS
BY John A. Hall
ATTORNEY

INVENTOR
S. B. WILLIAMS
BY John A. Hall
ATTORNEY

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 16

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 17

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 18

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 19

INVENTOR
S. B. WILLIAMS
BY [signature]
ATTORNEY

INVENTOR
S. B. WILLIAMS
BY John A. Hall
ATTORNEY

Jan. 16, 1951 S. B. WILLIAMS 2,538,636

DIGITAL COMPUTER

Filed Dec. 31, 1947 27 Sheets-Sheet 21

INVENTOR
S. B. WILLIAMS
BY John A. Hall
ATTORNEY

INVENTOR
S. B. WILLIAMS
BY John A. Hall
ATTORNEY

INVENTOR
S. B. WILLIAMS
BY John A. Hall
ATTORNEY

INVENTOR
S. B. WILLIAMS
BY [signature]
ATTORNEY

Jan. 16, 1951 S. B. WILLIAMS 2,538,636

DIGITAL COMPUTER

Filed Dec. 31, 1947 27 Sheets-Sheet 25

INVENTOR
S. B. WILLIAMS
BY [signature]
ATTORNEY

Jan. 16, 1951 S. B. WILLIAMS 2,538,636

DIGITAL COMPUTER

Filed Dec. 31, 1947 27 Sheets-Sheet 26

INVENTOR
S. B. WILLIAMS
BY John A. Hall
ATTORNEY

Jan. 16, 1951

S. B. WILLIAMS

DIGITAL COMPUTER 2,538,636

Filed Dec. 31, 1947

27 Sheets-Sheet 27

INVENTOR
S. B. WILLIAMS
BY John A. Hall
ATTORNEY

Patented Jan. 16, 1951 2,538,636

UNITED STATES PATENT OFFICE 2,538,636

DIGITAL COMPUTER

Samuel B. Williams, Brooklyn, N. Y., assignor to Bell Telephone Laboratories, Incorporated, New York, N. Y., a corporation of New York Application December 31, 1947, Serial No. 794,835

9 Claims. (Cl. 235—61)

This invention relates to digital computers for making calculations with numbers having a wide range of values with means having only a sufficient number of denominational orders to provide a desired degree of accuracy.

The object of the invention is to calculate with the significant digits of numbers and to automatically display results with the decimal point restored and displayed in its proper place.

In a specific embodiment of the invention the calculator will automatically trace the location of the decimal point over thirty-eight decimal denominational orders from a number expressing a value of over nine quintillions to one one-hundred-quintillionth, and display the result with the decimal point in its proper place. Since a seven-digit number is sufficient for the required accuracy for all general purpose calculations, the storing registers and calculating means are provided to handle only seven significant digits of each factor, and means are provided to register and to operate with only the first seven significant digits of each factor.

It should be clearly understood that the number of denominational orders which may be represented is unlimited and is only limited herein to thirty-eight places for certain utilitarian reasons based on the conception that this number of places will not only fulfill all of the ordinary uses of a general purpose calculator but will in fact fulfill many of the extraordinary uses thereof.

In accordance with this invention, numbers as handled by the calculator comprise a series of digits representing the number accompanied by an ancillary number of a small number of digits carrying certain information regarding the decimal point. The ancillary number enters into and takes an important part in the calculations.

This ancillary number is known as the exponent since it is an exponent of the value ten by which the number expressed by the digits set down is multiplied. By way of example, the number 1.234567 may be mathematically expressed as $$.1234567 \times 10$$

or more strictly as $$.1234567 \times 10^1$$

Now since all numbers may be so expressed, it is unnecessary to write down the decimal point each time, it being understood that this mathematical symbol is always placed just before the first significant figure. Moreover, it is unnecessary to write down the times sign or the ten since these are invariable and may be understood. Since it is intended to use numbers large enough to require a two-digit exponent, provision is made for two decimal denominational places for this ancillary number and so the number above may be written as $$1234567+01$$

If the number is a fraction, the exponent becomes negative and since the number itself may be either positive or negative an appropriate sign is used before the number. By way of example, the following numbers are listed:

$$+123{,}456{,}700{,}000{,}000{,}000. = +1234567+18$$
$$+1234567. = +1234567+07$$
$$+1.234567 = +1234567+01$$
$$+.1234567 = +1234567+00$$
$$+0000000001234567 = +1234567-09$$
$$-.0001234567 = -1234567-03$$
$$-1234.567 = -1234567+04$$

Therefore, the numbers in the following order are known as follows:

| | |
|---|---|
| 1.234567 | decimal notation |
| $1234567 \times 10^1$ | exponential notation |
| +1234567+01 | computer notation |

To this may be added another form, that in which the number is recorded on tapes from which it may be entered in the calculator. In this form it is necessary that a minimum number of characters be used since the process of reading a number from a tape is a step by step operation. In all the examples above, the number is a seven-digit number. However, many numbers may have far less than seven significant digits and, therefore, it is not necessary to read from the tapes anything more than the significant digits whereby a saving in time and number of operations may be effected. Therefore, the number is preceded by a single digit, indicating how many significant digits are recorded and will have to be read from the tape and the exponential data is coded. Since it is only in exceptional cases than even a mathematician will wish to deal with numbers having an exponent of greater than +19 or less than −19 the computer is limited (from a practical standpoint only) to two digits in the tens digit order of the exponent, that is the digits 0 and 1 and hence this value can be included in a code along with the sign of the number and the sign of the exponent. The codes used may be tabulated as follows:

| Code | Sign of Number | Sign of Exponent | Tens Digit of Exponent |
|---|---|---|---|
| $\overline{O}$ | + | − | 0 |
| $\overline{U}$ | + | + | 0 |
| $\overline{W}$ | + | − | 1 |
| $\overline{V}$ | + | + | 1 |
| $\overline{M}$ | − | − | 0 |
| $\overline{Z}$ | − | + | 0 |
| $\overline{F}$ | − | − | 1 |
| $\overline{S}$ | − | + | 1 |

With such a code, any number may now be expressed by writing down, first, a single digit expressing the number of significant digits in the number, second, a code symbol expressing the sign of the number, the sign of the exponent, and the tens digit of the exponent, third, a single digit expressing the units digit of the exponent and thereafter the significant digits of the number corresponding in number to the first digit of this number in tape notation. The following examples will illustrate the correspondence between certain numbers written in decimal notation and in tape notation.

| Decimal Notation | Tape Notation |
|---|---|
| +.012345 | =5$\overline{\text{O}}$112345 |
| +123. | =3$\overline{\text{U}}$3123 |
| +.0000000000001 | =1$\overline{\text{W}}$21 |
| +123,456,700,000,000. | =7$\overline{\text{V}}$51234567 |
| −.5 | =1$\overline{\text{M}}$05 |
| −5200. | =2$\overline{\text{Z}}$452 |
| −.000000000123 | =3$\overline{\text{F}}$0123 |
| −1,234,000,000. | =4$\overline{\text{S}}$01234 |

Now the first three digits of these numbers in tape notation may be considered an ancillary number accompanying the number itself and carrying certain information relative to the location of the decimal point. This ancillary number enters into the calculation and exercises a certain control over it.

In accordance with the present invention, numbers as factors in calculation are entered in the calculating device in decimal notation and the results derived are issued therefrom likewise in decimal notation. In practice, a device known as a processor is employed to automatically translate numbers in decimal notation to their equivalents in tape notation when the tapes are prepared. Alternatively, an operator may prepare the tapes by manually perforating the tapes in tape notation, the translation from one form to the other being accomplished mentally by the skill and acumen of the operator.

Within the computer numbers entered in tape notation are translated to computer notation as they are registered either for storage or directly for calculation. Other numbers taken from permanent tables or from other registers where they may have been registered as partial results and where the various digits thereof are transferred from place to place simultaneously are always in computer notation.

In all cases, numbers entering into calculation are in computer notation and are, therefore, accompanied by an ancillary number carrying certain information relating to the decimal point.

When results have been derived which are to be displayed as by being printed, the printing process includes a translation whereby the number in computer notation is changed to a number in decimal notation, so that without any special precautions, trial calculations or guesswork of any kind the results are printed in their natural form.

In accordance with this invention there is a shifting means provided for shifting one number until its exponent corresponds to the exponent of another when the two are to be added so that the two numbers will have the proper digits in corresponding denominational orders of an adder. By way of example, if to the number 1234567+03 is to be added the number 1234567+01 then the latter is shifted and its exponent adjusted until it becomes 0012346+03 whereupon the sum 1234567
0012346
1246913 is derived and since no carry-over into another decimal denominational order to the left was made the exponent 03 will apply to the result. If this result were to be printed the exponent 03 would cause the number to appear as:

124.6913

Further, in accordance with this invention maximum accuracy is attained by always dealing with the significant digits of a number, so that a feature of the invention is a means for shifting a desired result until the first significant digit appears in the first decimal denominational order. Thus in a calculation where a zero appears in the first left-hand order, the number is automatically shifted one place to the left and the exponent is reduced by one. By the same token, if a carry beyond the first left-hand denominational order is produced, then the derived number is shifted one place to the right and the exponent is increased by one.

By way of example, if a number 1000000+03 is subtracted from a number 1234567+03 the derived result is 0234567+03 but will be read out of the calculator as 2345670+02. Again, if the number 9000000+03 is added to the number 1234567+03 the derived result is 10234567+03 but since the first significant digit is now one place further to the left than there are places provided for registration, the number will be read out as 1023457+04. Thus there are means provided to automatically read out derived results with a significant figure other than zero in the first decimal denominational order.

In accordance with this invention the calculator includes a pair of two-digit exponent registers and a two-digit calculator. There are circuit means provided whereby the larger of the two exponents registered is always transferred to the addend A register of this two-digit adder and the smaller to the augend B register. The sum Z register then controls shift means whereby the algebraically smaller number offered as a factor for calculation is shifted until its exponent is brought into correspondence with the exponent of the larger number and thereafter the calculation is made since the two numbers have been lined up with each other with respect to the decimal point.

Further, in accordance with the present invention, means responsive to the alebraic magnitude of the exponents of two numbers to be used as augend and addend is employed to invariably enter the number with the larger exponent into the addend register of a calculator and the number with the smaller exponent into the augend register thereof.

A feature of the invention is a method of calculating with the significant digits of numbers and simultaneously making ancillary calculations with ancillary numbers to determine and control the column shift of the said significant digits to correlate the numbers entering any given calculation.

Another feature of the invention is a means for comparing the ancillary numbers of two factors to be entered into a calculator to determine which of the two is numerically larger and to

BEST AVAILABLE COP then combine the information derived with the algebraic signs of the two ancillary numbers to determine which of the two is algebraically larger.

In accordance with the present invention the ancillary calculator performs two functions in each calculation. First, it determines which of the two numbers presented to the adder is algebraically the larger and thereupon controls the extent to which the algebraically smaller of the numbers must be shifted before the summing operation takes place. After the sum has been obtained then a correction of the ancillary number must be made for the first significant digit of the sum may be located at some other point than the first significant digit of the algebraically larger of the two numbers. Therefore, the ancillary calculator is employed to correct the ancillary number of the result. If, for instance, the ancillary number of the larger of the two numbers is 3 and there is a carry-over in the sum, then 1 is added to the ancillary number of the larger of the numbers and a new ancillary number 4 produced thereby. If, as another example, the ancillary number of the larger of the two numbers is 3 and in the summing operation the first three significant digits become zero, then 3 is subtracted from the ancillary number of the larger of the two numbers and the ancillary number of the result becomes zero.

Another feature of the invention, therefore, is an ancillary number calculator for calculating the number of places the algebraically smaller of two numbers must be shifted to be added to the larger of the said two numbers by subtracting the ancillary number of said smaller number from the ancillary number of said larger number and for calculating the value of the ancillary number of the sum of said two numbers by correcting the ancillary number of the larger of said two numbers by the number of places the first significant digit of the result differs from the location of the first significant digit of the said larger of said two numbers.

Another feature of the invention is a method of calculating with numbers of a wide variation in value which consists of expressing such numbers in exponential form, comparing the exponents of the numbers to be used as factors in a calculation, converting one of said numbers to an equivalent number having the same exponent as another of said numbers, thereafter summing the converted one of said numbers and the said other of said numbers and translating the sum expressed in exponential form to its decimal form.

The drawings consist of twenty-seven sheets having twenty-seven figures as follows:

Fig. 3 is a block diagram showing how Figs. 4 to 25 may be placed to form a schematic circuit diagram of the components of Figs. 2; and wherein

Figure 22:
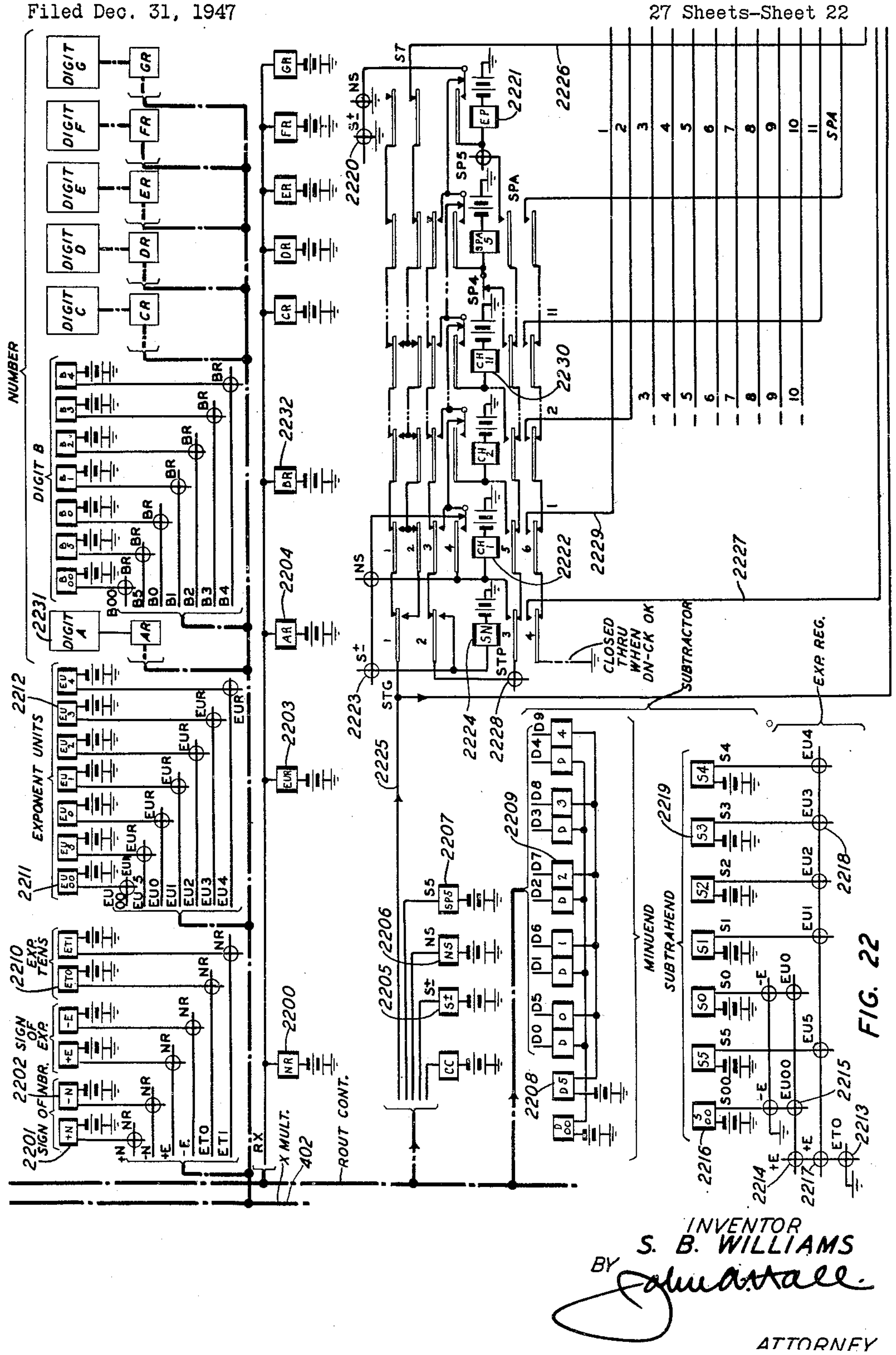
Figure 23:
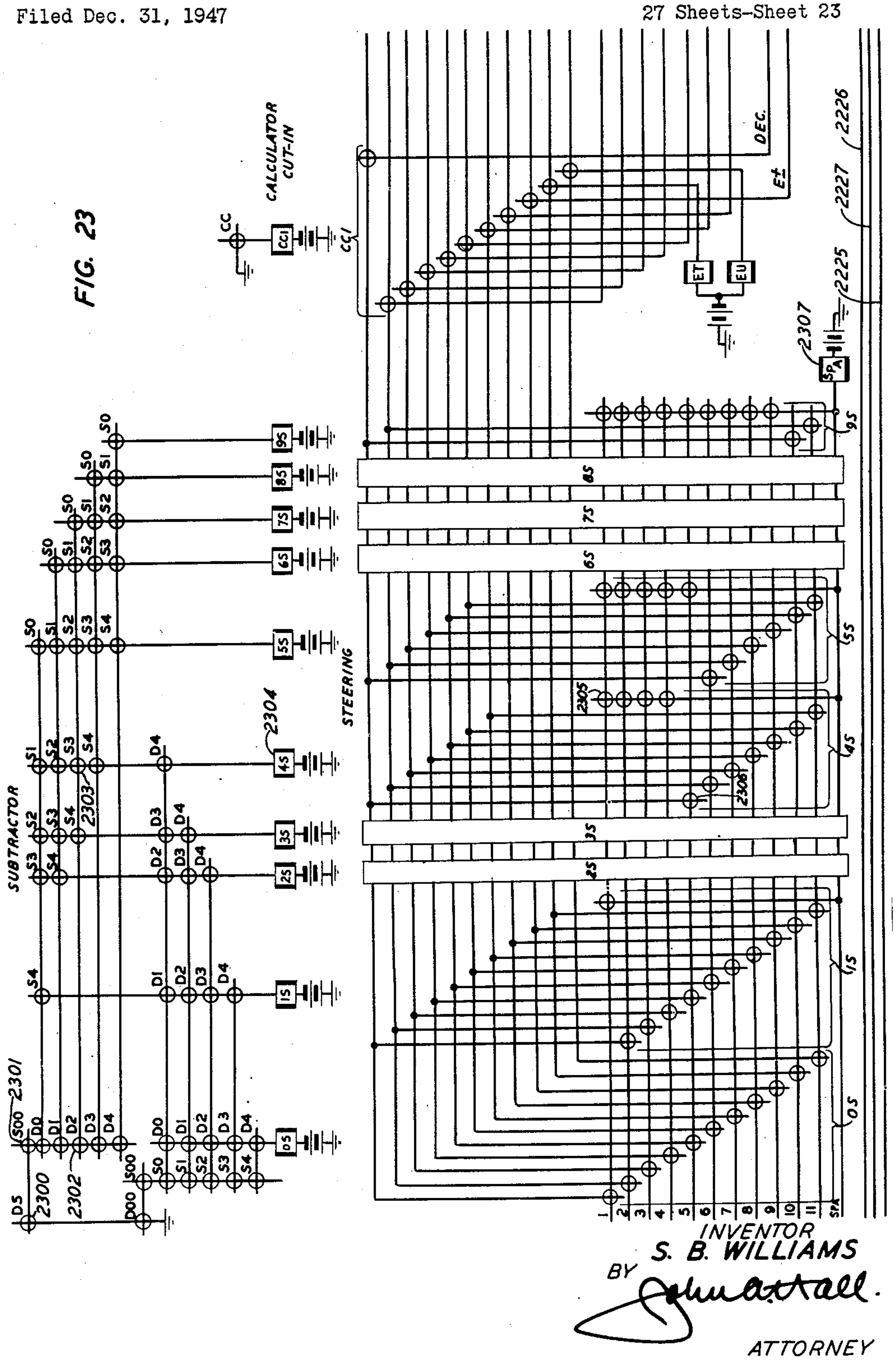
Figure 24:
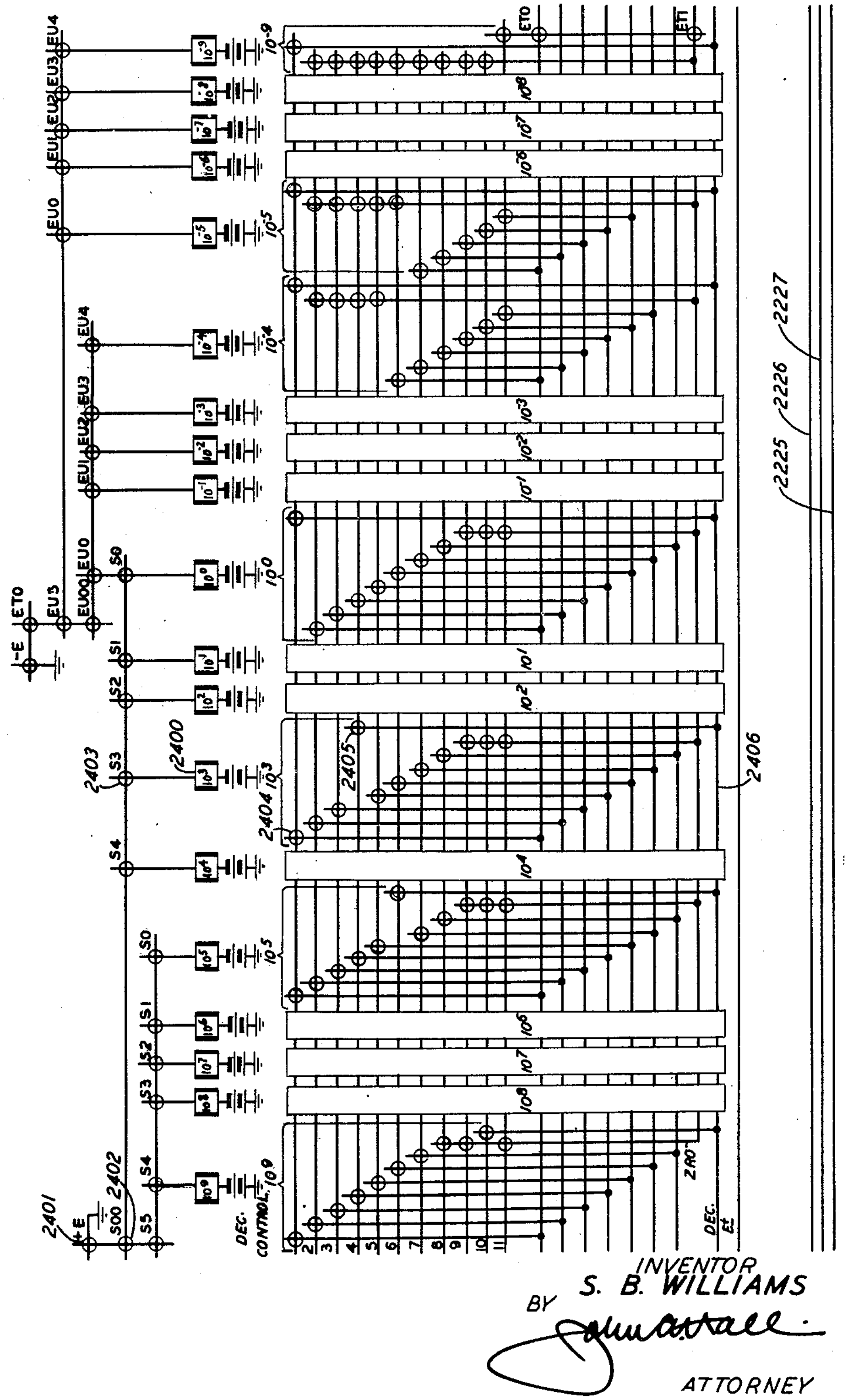
Figure 25:
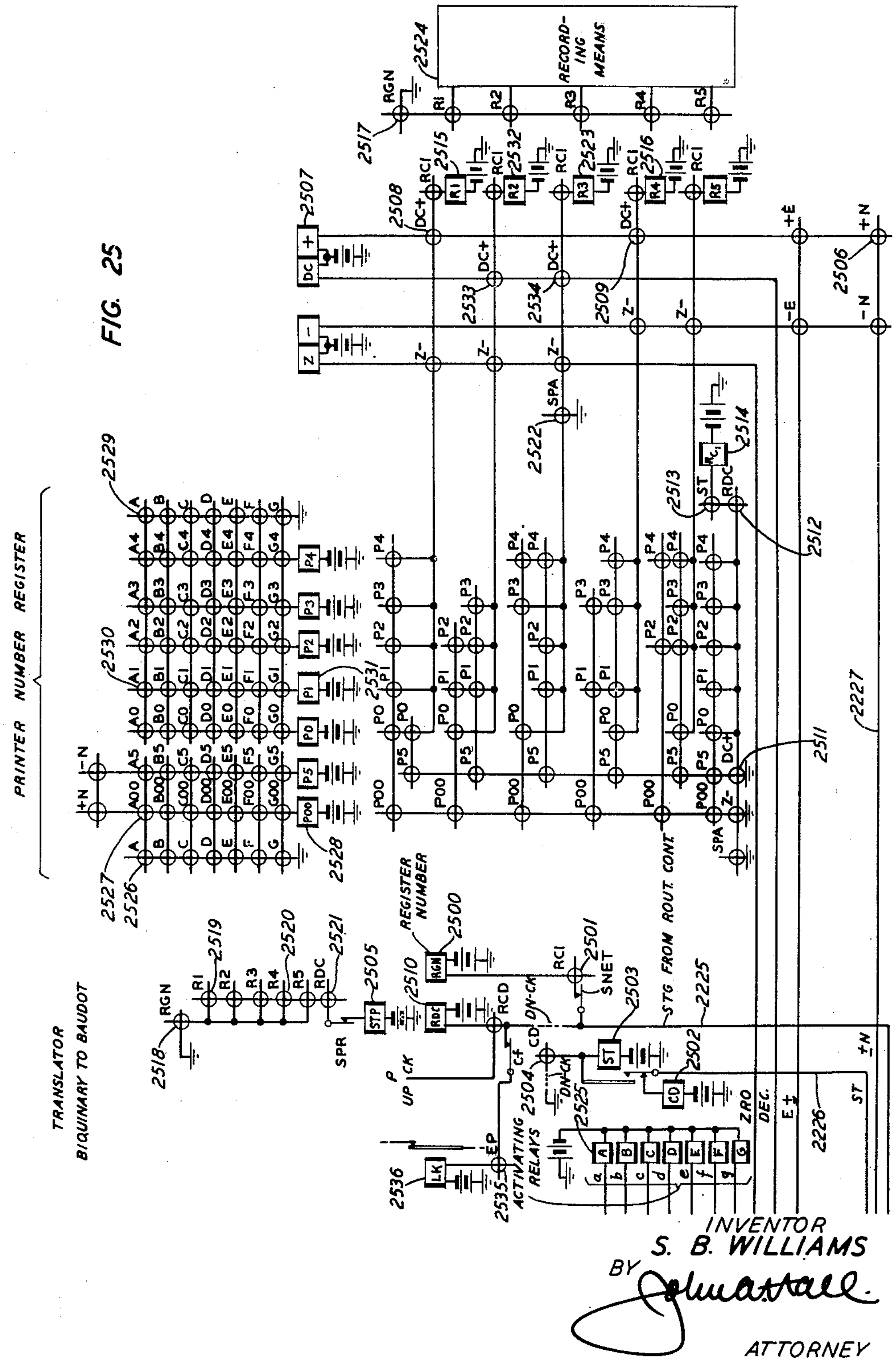

Figs. 22 to 25, inclusive, show the means for printing or recording of a result, Figs. 22 and 23 showing the means for calculating the number of spaces which the printer will have to insert before printing the first significant digit of a figure, Fig. 22 showing the minuend and subtrahend means of this calculator and Fig. 23 showing the remainder means thereof. Fig. 22 also shows the steering chain whereby the proper digits are transmitted to the printer number register for translation and printing and Fig. 23 shows the means for automatically causing the printer to space in accordance with the space calculation which has been made. Fig. 24 shows the means for inserting the decimal point at the proper place in a number and Fig. 25 shows the printer number register and the translator whereby each digit at a time is translated from the biquinary code in which it is registered within the computer system to the Baudot code which is used for the operation of the machine switching printer; and Figs. 26 and 27 with Fig. 26 placed above Fig. 27 comprise a sequence chart showing the sequence of operation of many of the relays of the present arrangement.

In the following description a convention is used for the purpose of simplifying the circuit diagrams which consists essentially of two lines crossing each other at right angles with the crossing point enclosed by a small circle. This indicates a contact on some relay which is normally open and which will be closed when the relay is operated. Beside this circled cross-point there will be a designation of the relay to which this pair of contacts belongs. By way of example, in Fig. 4 the REX relay 400 has numerous contacts which it closes. One of these is the contact point 401 which will close a connection between the conductor +E leading from the X multiple 402 to one winding of the EXP relay 403. Thus, when the REX relay 400 is operated and a ground exists on the +E conductor, the EXP relay 403 will operate. It will also be plain that through a pair of contacts 404 controlled by itself the EXP relay 403 will lock to a ground through a back contact 405 of a release relay RLX to a ground supplied either by a relay HX or a relay G1—2. Throughout the drawings all circled cross-points, therefore, will be normally open contacts. There are a few instances in which normally closed contacts, such as the back contact 405, are shown and these are more in the well-known conventional showing of an armature and its back contact.

Again for convenience in following the description and easily locating some relay or other circuit component, each designating number will consist of one or more digits in strict correspondence to the figure number followed by two digits, a tens and units digits local to such figure. Thus, the numbers 400 to 405 spoken of before are all found on Fig. 4. Where a long circuit is involved the designating number used throughout the various sheets will bear the identification of the sheet or figure from which the circuit was traced.

Mention will be made hereinafter of up-check and down-check circuits. A full explanation of such circuits particularly as used in a calculating device will be found in Patent 2,486,809, issued November 1, 1949, to G. R. Stibitz. An up-check circuit generally is a long series circuit involving contacts of every relay in a calculator component such as a register and is used to prove that not only has a number of relays in each decimal denominational order thereof been operated but only the proper number has been operated so that the closure of the up-check circuit proves the logical operation of the device. In the biquinary system used herein the up-check circuit proves that one and one only relay in each binary part and one and one only relay in each quinary part of each decimal denominational order has been operated. A down-check circuit likewise is a long series circuit involving a back contact of every relay of a register or other calculator component which proves when it is closed that the component is in its normal released condition ready for use. There are some instances in which a down-check circuit will appear as a conductor connected in parallel to a front contact of every relay in the register or other component whereby a given electrical condition may be placed on such conductor by each of the relays thereof. The absence of this given electrical condition will, therefore, prove that not a single one of the relays is operated but that on the other hand every one is in its released condition.

As a general principle of operation the computer system works on a checking basis. When, by way of example, the calculator is taken for use it must be completely checked through its down-check circuits to see that it is completely free and, therefore, ready to undertake a given task. When this down-check operation has proved that the calculator is in condition to be used, then the read-out relays from the components which are to supply the information to the calculator are operated as well as the read-in relays of the calculator. Therefore, the information is passed to the calculator whereupon the up-check circuits of the calculator operate to give the signal that complete information has been supplied thereto. This signal will result in the disconnection of the read-out relays of the components from which the information is supplied as well as the read-in relays of the calculator whereupon a down-check operation is started to prove that the transmission paths between the components from which the information is supplied and the calculator have been completely disconnected and are now ready for use in some other connection. When this last down-check operation is completed the calculator will be signaled to proceed with its operations.

For the sake of clarity in describing the present invention wherein the novelty resides in the operation of the ancillary number calculator and the control it exercises over the character of the calculation, the down-check circuits are not completely shown. These, however, are known in the prior art and their operation will be easily understood by those skilled in the art. In the following detailed description it will be noted that numbers are entered into the registers of the calculator over trunks known as the X and Y multiples. Under general supervision of a circuit known as the routine control circuit, there are certain relays within the calculator whose circuits are controlled by these up and down-check circuits and their operation will be described but their circuits will not be shown because the details are unimportant. The method of operation is known and the extra drawings and description necessary for their complete showing would unduly burden the present specification.

The biquinary code system is used in the calculator of the present invention. Under this system each decimal denominational order of a register consists of a binary group of two relays designated 00 and 5 and a quinary group of five relays designated 0, 1, 2, 3 and 4. A registration of a digit consists of the operation of one relay in the binary group and one relay in the quinary group and the sum of the numbers used to designate these relays will express the number which is being registered.

The designation of these relays in the various registers is also combined with other designations which will characterize the register. For instance, the X exponent register of the calculator shown in Fig. 4 has the two binary relays EX00 and EX5 and the five quinary relays EX0, EX1, EX2, EX3 and EX4. If an exponent of value 1 is registered in this register then the EX00 and EX1 relays will be operated.

THE PRIOR ART

The apparatus used in constructing the device of the present invention is mostly standard communication apparatus, details of which may be found in the following references.

The relays are of types shown in patents:

1,156,671, E. B. Craft, Oct. 12, 1915
1,633,576, C. H. Franks, June 28, 1927
1,652,489, E. D. Mead, Dec. 13, 1927
1,652,490, D. D. Miller, Dec. 13, 1927
1,652,491, D. D. Miller, Dec. 13, 1927
2,169,551, C. I. Baker, Aug. 15, 1939
2,178,656, P. W. Swenson, Nov. 7, 1939
2,323,961, F. A. Zupa, July 13, 1943

A computer system showing the biquinary code, relay registers and up-check and down-check circuits is shown in Patent 2,486,809, G. R. Stibitz, Nov. 1, 1949.

Large electrical networks operated by routine tapes are shown in patents:

2,328,750, Smith et al., Sept. 7, 1943
2,348,680, Hanson et al., May 9, 1944

Large computer systems, over which the present invention constitutes an improvement are shown in the following copending applications:

| Serial No. | Filing Date | Inventor |
|---|---|---|
| 716,680 | Dec. 17, 1946 | Andrews-Vibbard |
| 716,793 | Dec. 17, 1946 | Juley |
| 716,827 | Dec. 17, 1946 | Vibbard |
| 716,783 | Dec. 17, 1946 | Strickler |
| 716,753 | Dec. 17, 1946 | Cesareo |
| 716,754 | Dec. 17, 1946 | Cesareo-Strickler |
| 716,762 | Dec. 17, 1946 | Andrews |

GENERAL ORGANIZATION OF COMPUTER SYSTEM

Figure 1:
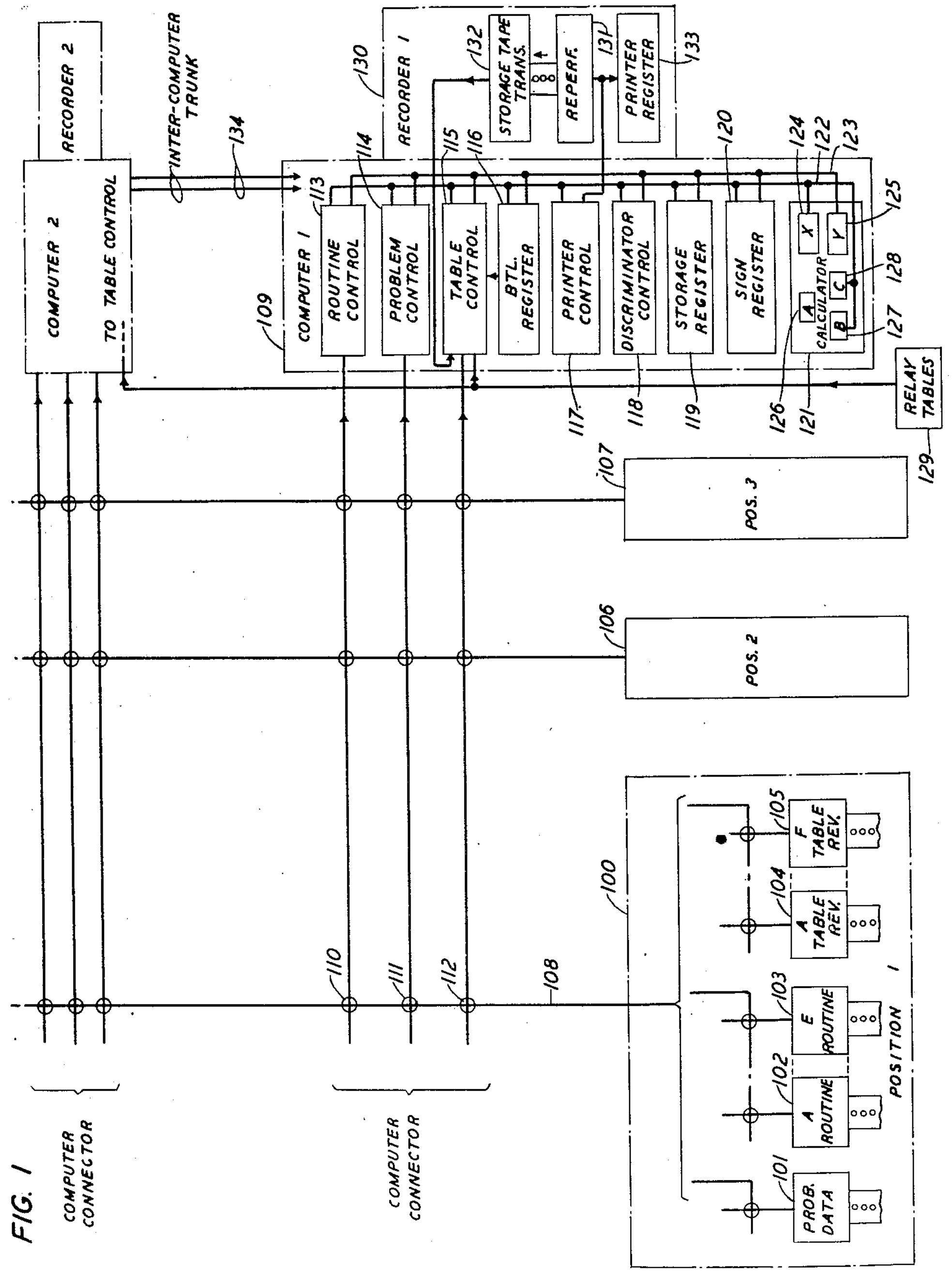
Fig. 1 is a block diagram used for explaining the cooperative relationship of the various components of a computer system embodying the present invention.

Fig. 1 shows the bare outlines of a computer system in which the present invention is employed. The system consists essentially of a plurality of positions and a plurality of computers interconnected by a coordinate arrangement of computer connectors. Each position as that indicated by the broken line rectangle 100 includes a plurality of tape transmitters, there being one such as the transmitter 101 for introducing problem data into the computer, a plurality indicated by the transmitters 102 and 103 for transmitting routine orders to the computer and another plurality indicated by the transmitters 104 and 105 for transmitting tabulated information into the computers. In this figure, three positions 100, 106 and 107 are indicated. Extending from each position is a trunk such as the trunk 108 consisting of a large number of conductors which may be connected to a computer 109 by a computer connector here indicated by the contacts 110, 111 and 112. When the contacts represented by these three contacts are closed, then the position 100 will be connected to the computer 109.

The computer consists of a number of components here indicated as the routine control circuit 113, the problem control circuit 114, the table control circuit 115, the BTL register 116, the printer control circuit 117, the discriminator control circuit 118, a plurality of storage registers represented by the register 119, a sign control circuit 120 and a calculator 121. Throughout the computer will be a trunk or a plurality of wires multipled to the various components of a calculator 122 known as the X multiple and a similar trunk 123 known as the Y multiple. By means of these multiples, numbers may be moved from the various components to and from the calculator. If a number is moved to the calculator over the X multiple it will be registered in the X register 124 therein and likewise if it is moved to the calculator over the Y multiple it will be registered in the Y register 125 therein. Numbers registered in the X and Y registers are then ready for calculation and will be moved in accordance with a given plan to the A and B registers 126 and 127 therein. In the case of straight addition, numbers will be moved to the A and B registers of the calculator and summed in the C register 128 thereof and may be moved from the calculator back out over the X multiple 122 to some storage register or other component of the calculator. It will appear hereinafter that this calculator is of the type known as the two-cycle calculator which may best be explained simply by pointing out that in the case of multiplication the multiplicand is first moved to the A register, the B register is set to zero and the quantities in the A and B registers are then summed into the C register. If the multiplier is of a greater value than one, then as soon as this first operation has taken place the quantities in the A and C registers are then summed into the B register and this process will be carried out automatically a number of times indicated by the multiplier digit.

There will be common to all of the computers a number of permanent relay tables 129 by means of which and through the agency of the table control circuit 115 numbers may be extracted from such permanent tables. Associated with each computer is a recorder here represented by the broken line rectangle 130 consisting of a reperforator 131 operated by the printer control 117 so that if all of the registers of a computer are occupied, some computed number which must be saved for further use may be perforated on a tape and may be given up again by the storage tape transmitter 132 under control of the table control 115. Alternatively, the printer control may direct numbers through the printer register 133 for the final recording of results.

There will also be a multiple 134 known as an intercomputer trunk whereby unused facilities of one computer may be temporarily appropriated and used by another computer. It may be mentioned at this point that whereas seven-digit numbers will give sufficient accuracy for more engineering problems, there will be times when greater accuracy is required and by the use of an intercomputer trunk, two or more computers may be teamed together so as to calculate in fourteen or greater number of digit numbers.

By means of the switching devices here represented by the computer connectors and by automatic circuits for controlling these computer connectors any one computer may be connected to any one position. If there be more positions than there are computers then an idle position may be loaded with appropriate tapes so that as soon as a computer becomes idle through having finished the computations required by the position to which it is connected, then it will be automatically disconnected from such position and appropriated to the heretofore idle position.

The present invention is not limited to this particular type of computer system but such a computer system is outlined in this manner to show how the present invention fits into the very complicated arrangement.

GENERAL OPERATION OF CALCULATOR

Figure 2:
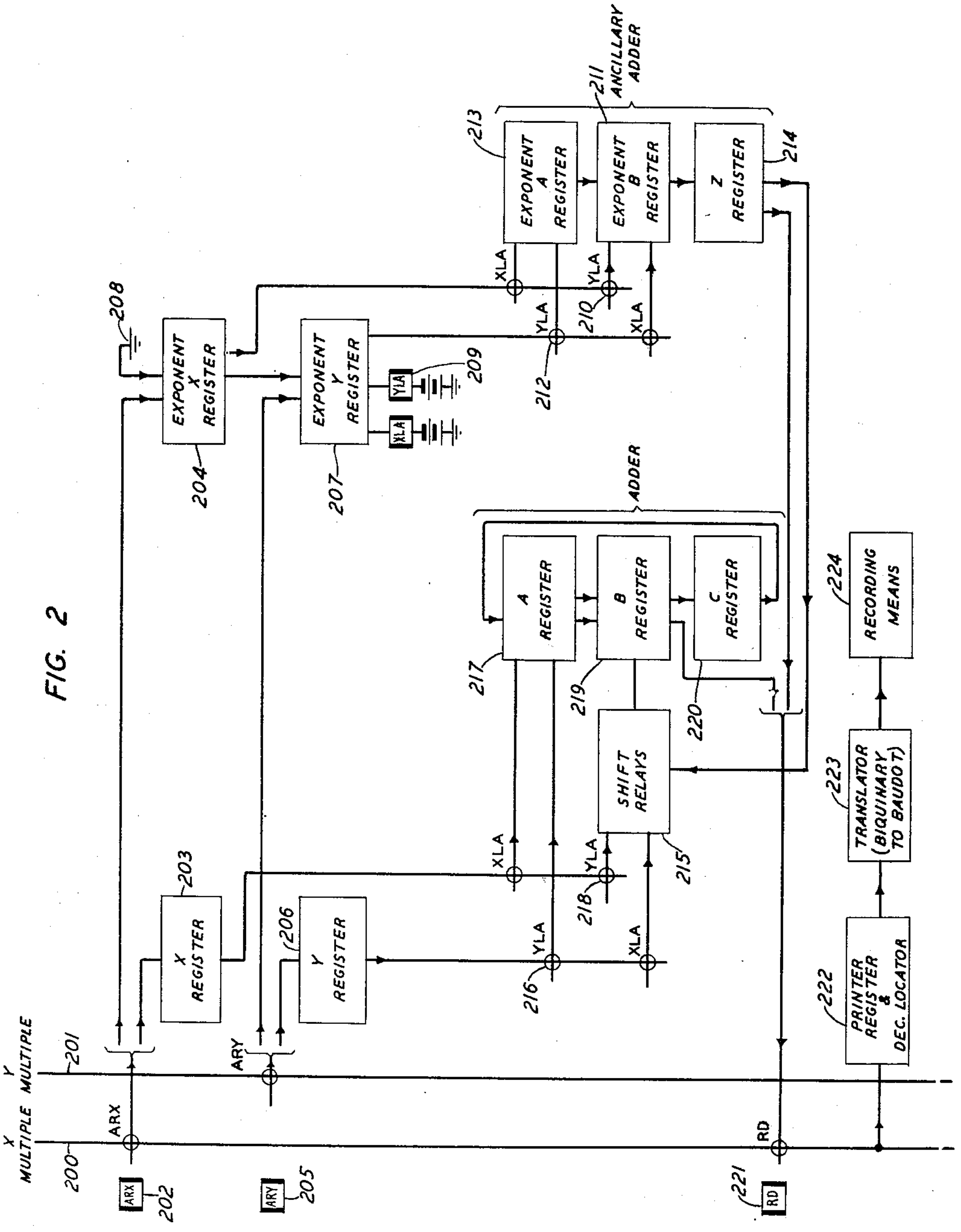
Fig. 2 is a flow chart used to explain the sequence of operations in the addition of two factors registered in the exponential form.
Figure 1:
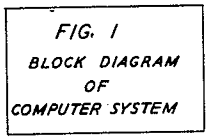
Figure 2:
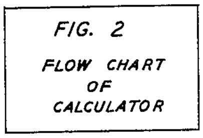
Figure 3:
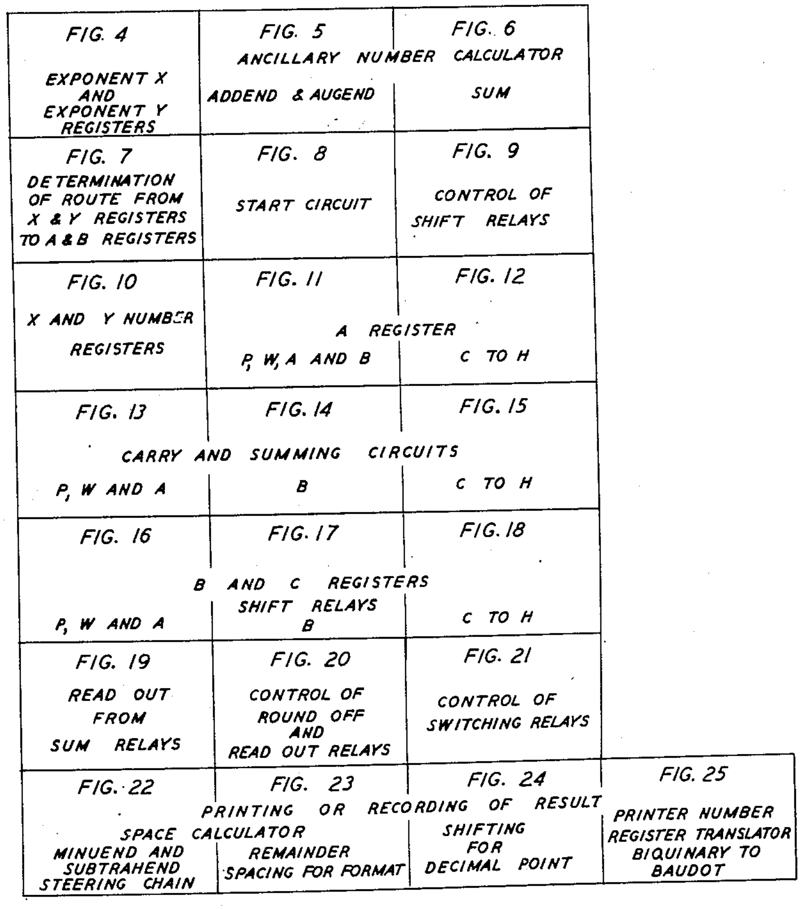

Fig. 2 is a flow diagram showing an X multiple 200 and a Y multiple 201. There is an ARX relay 202 for connecting the X multiple into the X register 203 and the exponent X register 204 and likewise an ARY relay 205 for connecting the Y multiple into the Y register 206 and the exponent Y register 207. In order to illustrate the invention and particularly in connection with Figs. 4 to 25, inclusive, it will be shown how the number 1.234567 will be transmitted over the X multiple to be added to the number 123.4567 transmitted over the Y multiple. The first of these numbers in computer notation will be +1234567+01 and the second of these numbers will be +1234567+03. Therefore, the figure 01 will be registered in the exponent X register 204 and the figure 03 will be registered in the exponent Y register 207. As soon as these numbers have been registered a circuit will be extended from a ground 208 through the exponent X register and the exponent Y register to operate the YLA relay 209. The YLA relay means that the exponent in the Y register is larger than the exponent in the X register and this relay will fundamentally control the further transmission of numbers. Thus, with the YLA relay 209 operated the exponent in the X register will now be transmitted through the contacts 210 to the exponent B register 211 and the number in the exponent Y register wil be transmitted through the contacts 212 into the exponent A register 213. The exponent A register constitutes the augend means and the exponent B constitutes the addend means of the ancillary number calculator and in accordance with the number registered therein a result will be summed into the Z register 214. This result will primarily operate the shift relays 215 whereby the number +1234567+01 is shifted until it appears to be +00123456+03.

The number 1234567 in the Y register is now connected through the contacts of the YLA relay represented by the contact 216 to the A register 217 of the adder and the sum 1234567 in the X register 203 is transmitted through the contacts 218, thence through the shift relays 215 so that it is registered in the B register 219 as 00123456. The numbers in the A register 217 and the B register 219 are now summed into the C register 220 as 12469126. When this sum has been taken, an automatic operation known as the round-off takes place. This consists of adding 5 to the extreme right-hand digit (the eighth significant place) so that if the value in this is less than 5 no carry to the next place wil occur but if the value in this place is 5 or more a carry 1 will increase the next to the last right-hand digit by this amount. In the present case this round-off operation will derive the following sum:

$$\begin{array}{r} 12469126 \\ 00000005 \\ \hline 12469131 \end{array}$$

It will be noted that the calculator is of that type known as a two-cycle calculator. The first sum having been taken through the contacts of the A and B relays and registered in the C register the sum produced on round-off is taken through the contacts of the A and C registers and registered in the B register.

A correction in the exponent may now be made. Since the number registered in the exponent A register is always the larger, then a sum is taken in the ancillary number calculator adding to this number registered in the exponent A register the number of places by which the first significant digit of the sum in the B registers is displaced to the right or subtracted therefrom the number of places by which this first significant digit is displaced to the left. In the example given, since the sum exactly lines up with the number originally placed in the A register the value 0 will be added to the value 3 in the exponent A register so that the Z register will now contain the value 3 which will be read out along with the number derived and registered in the B register. The numbers in the B register and the exponent in the Z register may now be read out through the RD relay 221 into the X multiple where this result may be transmitted to any given point. This number, by way of example, may be transmitted into the printer register and decimal point locator 222 wherefrom it may be translated in the device 223 and printed or recorded in the device 224.

As another example of the correction made in the ancillary number register the number 1000000+03 may be subtracted from the number 1234567+03 whereupon the result derived will be 0234567+03 (from a mathematical standpoint). However, the number 03 will be registered in the exponent A register but since the first significant digit of the result 2 is from a columnar standpoint one place to the right, 1 will be subtracted from the figure in the exponent A register so that the Z register will have the value 2 registered therein. This will be read out into the X multiple as the value +02 and at the same time the result 2345670 will be read out into the X multiple in such a way that the digit 2 in the B denominational order of the calculator will be read into the A denominational order of the X multiple to be registered in the A denominational order of any register into which it is transmitted.

Again, if the number 9000000+03 is added to the number 1234567+03 the derived result is 10234567+03 (from a mathematical standpoint). However, since a significant figure now appears in a column 1 to the left of the first significant figure of the addend then the value 1 will be added to the value 3 in the exponent A register and the value transmitted from the Z register will be +04. In like manner, this will also control the transmission of the number 10234567 from the W, A, B, C, D, E and F orders of the calculator into the A, B, C, D, E, F and G orders of the X multiple for registration in any register to which the X multiple may at this time be connected.

DETAILED DESCRIPTION

*The routine order*

In accordance with know arrangements the calculator of the present invention is operated by routine orders transmitted from a routine tape. We will assume in the present instance that a routine order $$FC+GH=QPFKHE\overline{O}$$

has been transmitted from the routine tape. This will cause certain operations within the routine control circuit here represented generally by the rectangle 406. In a general way, this means that a cerain numerical quantity deposited in the F register will have added to it a certain numerical quantity now deposited in the G register and that the sum derived will be thereupon printed. Although we are not at present concerned with such matters it may be noted that when the quantity is taken from the F register this F register will be cleared and left in a normal unoperated condition. It will be further noted that when the quantity has been taken from the G register the registration in this G register will be held therein for use additionally in some other and later operation. The part of the routine order after the = sign consists of orders to carry out a specific routine in the printing of the result which routine is designed to fix the format of the printing. The first letter Q means that the result is to be printed. The second letter P is a signal to the printer circuit to begin its operation of printing. The third letter F is an order that the sign of the number is to be printed and that five spaces after the number are to be provided before another column in the format is to be introduced. The letter K means that eleven spaces are assigned for digits and the decimal point so that when the twelfth space provided for printing the sign is considered and the five spaces after the number the format will consist of a column in which a vertical line of

BEST AVAILABLE COP signs will appear and then a column of figures the first significant digit of which may start in any column but the last figure be it a digit or a zero used for filling out spaces will be in the twelth vertical column with five vertical columns of spaces allowed to the next column of figures which may be printed on the page. The letter H is a direction that the decimal point is to be invariably printed in the eighth space after the sign of the number. This, of course, may be changed at will but is chosen here to give an example of how the printing is controlled by the value of the exponent of the number read out of the calculator. The symbol $\overline{EO}$ indicates the end of the order.

We will further assume that the quantity in the F register is +1234567+01 and that the quantity in the G register is +1234567+03.

Figure 26:
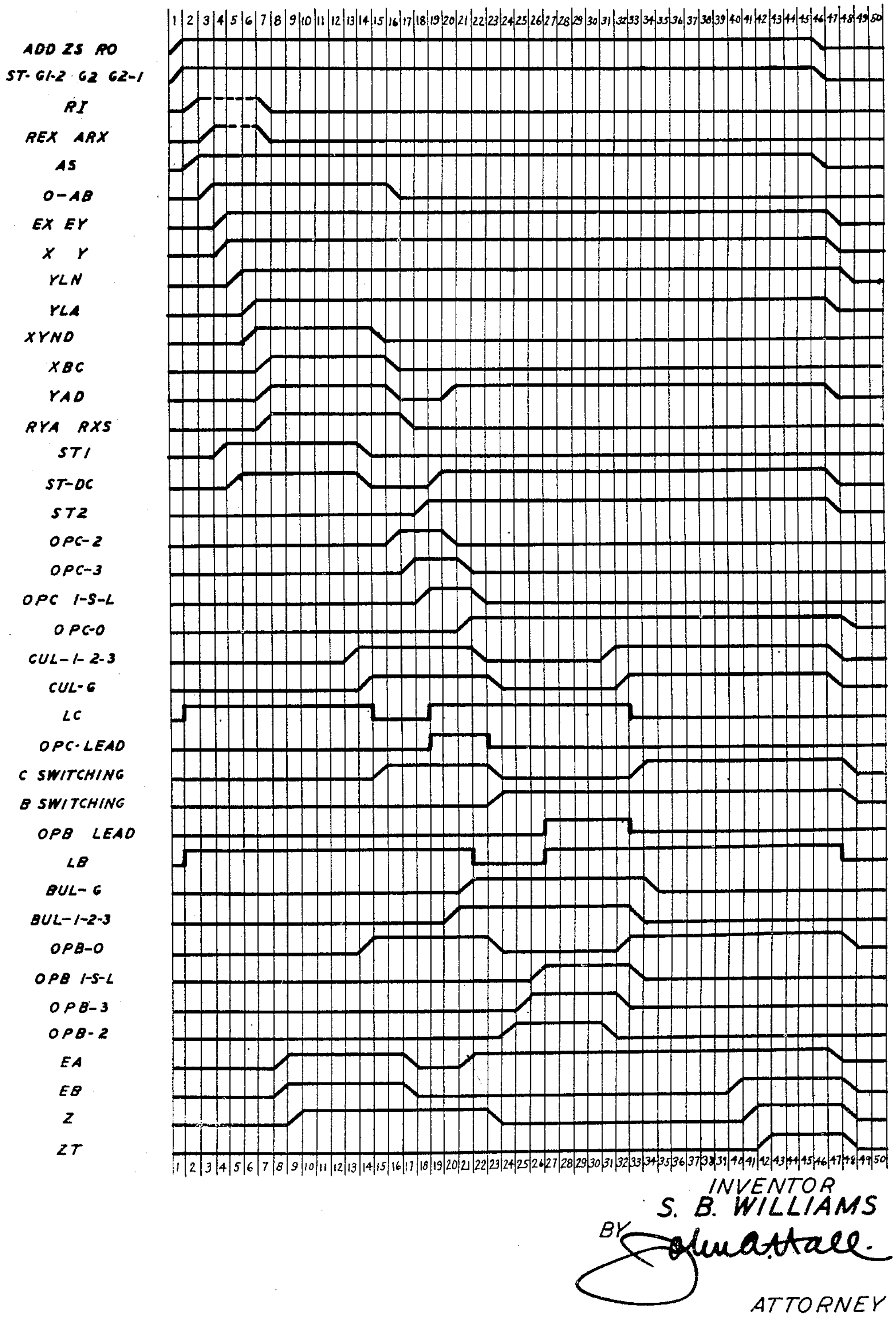
Figure 27:
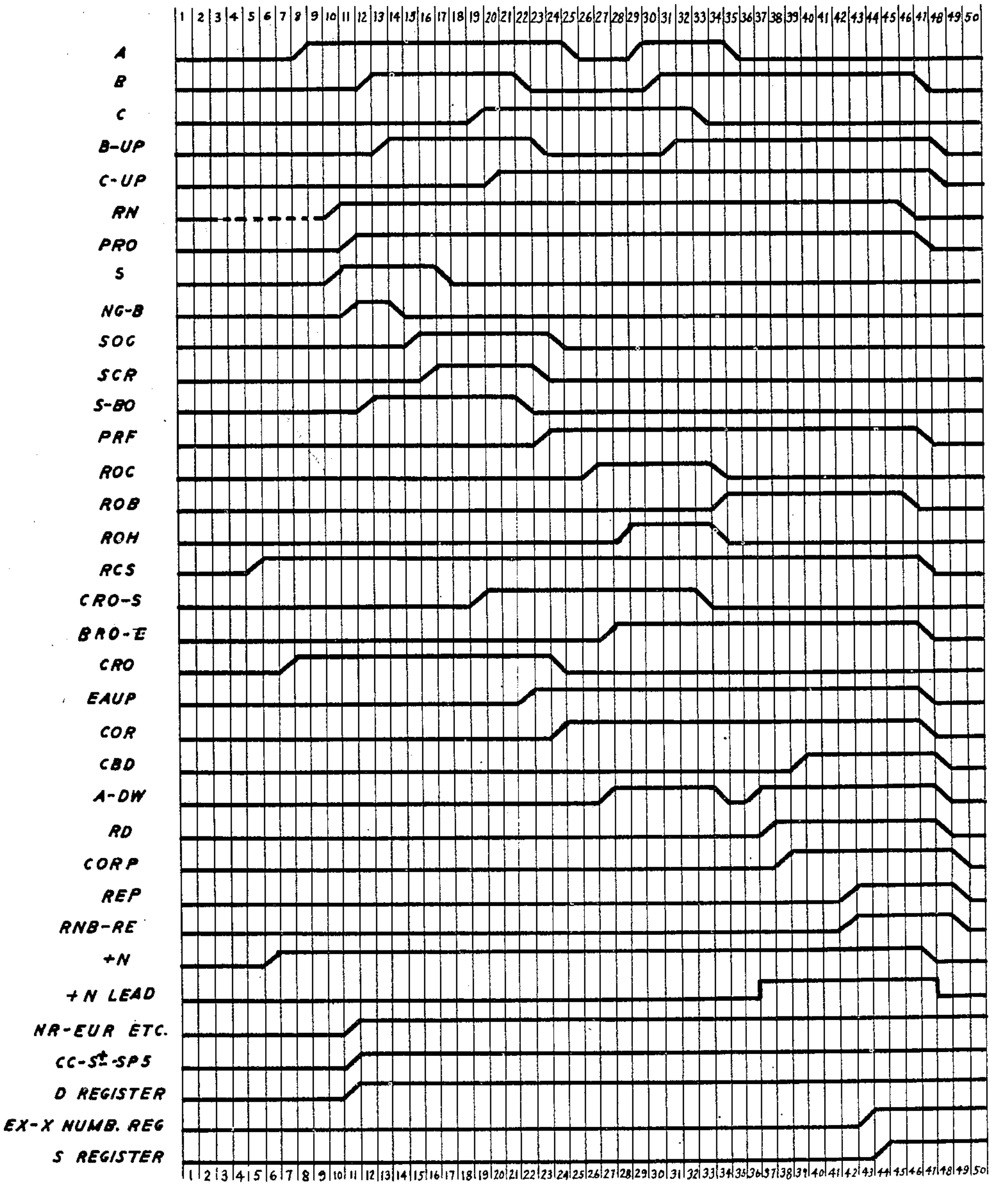

The operations to be described may be followed with the aid of the sequence chart, Figs. 26 and 27. This chart is based on a number of time intervals which are correspondingly numbered as such interval represents the time it takes for a relay to operate or to release and these intervals are uniform throughout the chart but do not represent the actual relative times taken for the various relays to so operate or release. It should be noted that the calculator of the present invention consists of a vast and complicated circuit arrangement in which every operation is dependent upon the completion of some other operation and that no relative time intervals are incorporated therein.

It should also be noted that in order to avoid an unduly long and complicated disclosure, certain circuit functions known in the prior art are herein described as taking place. This is notably true in connection with the various up-check and down-check circuits.

*Response to routine order*

As soon as the first two parts of the routine order FC+GH= have been transmitted, the routine control circuit will start its operations and will thereupon seize the calculator and operate certain relays therein. This is pictured as follows:

In interval 1 the ADD relay 800, the ZS relay 2002 and the RO relay 2000 are operated. The ADD relay as its designation implies is to control the operation of addition and is one of a group of relays, others of which control the operations of subtraction, multiplication, division and square root. The ZS relay is known as the zero shift relay and controls an operation above described by which the result obtained is shifted until the first significant digit appears in the A denominational place when this result is transmitted over the X multiple. Companion to this relay is another one designated CZS which means cancel the zero shift operation and this is employed for certain purposes which need not here be described. The RO relay as its designation implies is to control the operation of rounding off and is companion to a relay NRO which will prevent the round-off operation. One and one only of each of these three groups of relays must be operated to cause a regular calculator to start.

In this first interval also a number of ground control relays such as the G1—2 relay 407, the G2 relay 1001, the G2—1 relay 801 and the ST relay 408 are operated. The ST relay 408 is shown as extending in a circuit from the routine control through a dotted line which represents a down-check circuit extensive in nature which proves that the calculator is entirely released and in a normal condition ready to take up a new duty. If this circuit is not closed then no other operation takes place at this time but eventually an alarm will be given so that an attendant may investigate the difficulty. If the circuit is in proper condition then the ST relay 408 will operate and lock through its own contacts 417 and the G1—2 contacts 418 to ground. The ST relay 408 will remain operated thereafter until the calculator is dismissed.

At the end of this first interval and upon the operation of the ST relay the locking circuits for the B and C calculator relays will be closed. Looking at Fig. 18 it will be seen that a ground circuit is closed through the ST contacts 1826, the back contacts of the BUL—G relay to the LB lead which functions for locking the B relays as they are operated. A similar circuit through the back contacts of the CUL—G relay will ground the LC lead.

*Reponse to up-check circuit—Registration of numbers in X and Y registers*

If one and one only of the main controlling relays as above described have been operated then in the second interval a circuit will be closed from ground through such an up-check circuit to the winding of the R1 relay. This may be traced from ground through the G2 contacts 1017, an up-check circuit controlled by one and one only of the add, subtract, multiply, divide and square root relays, one and one only of the RO and NRO relays, one and one only of the ZS, CZS and an SIL relay, through the winding of the RI relay 1000 to battery. The read-in relay causes the operation of a plurality of other relays to connect the transmission conductors of the X multiple to the corresponding register relays within the calculator. Thus, in interval 3 the REX relay 400, the REY relay 409, the ARX relay 1004, the RSXR relay 1002, the RSX relay 1003 and others shown on Fig. 10 which perform similar functions will be operated. Through this means the number transmitted over the X multiple which we will assume, by way of example, to be +1234567+01 and the number transmitted over the Y multiple which we will similarly assume to be +1234567+03 will be registered, the exponents 01 and 03, respectively, being registered in the exponent registers of Fig. 4 and the numbers in the number registers of Fig. 10. The signs of the numbers and the exponents have all been assumed to be plus and, therefore, the EXP relay 403 will be operated over the +E lead through the REX contacts 401. The EYP relay 413 will be similarly operated over the +E lead, the REY contacts 419 to the EYP relay 413. In the X register the number 01 will be registered through the operation of the EXT0 relay 410, the EX00 relay 417 and the EX—1 relay 412. In the Y register the number 03 will be registered through the operation of the EYT0 relay 414, the EY00 relay 415 and the EY—3 relay 416. These registrations are locked in through the circuits provided from ground through the G1—2 contacts 420 to the locking windings of the X register relays and from ground through the G1—2 contacts 421 to the locking windings of the Y register relays. It will be seen from the sequence chart that these numbers having been registered will remain so registered until the calculator is dismissed.

Figure 10:
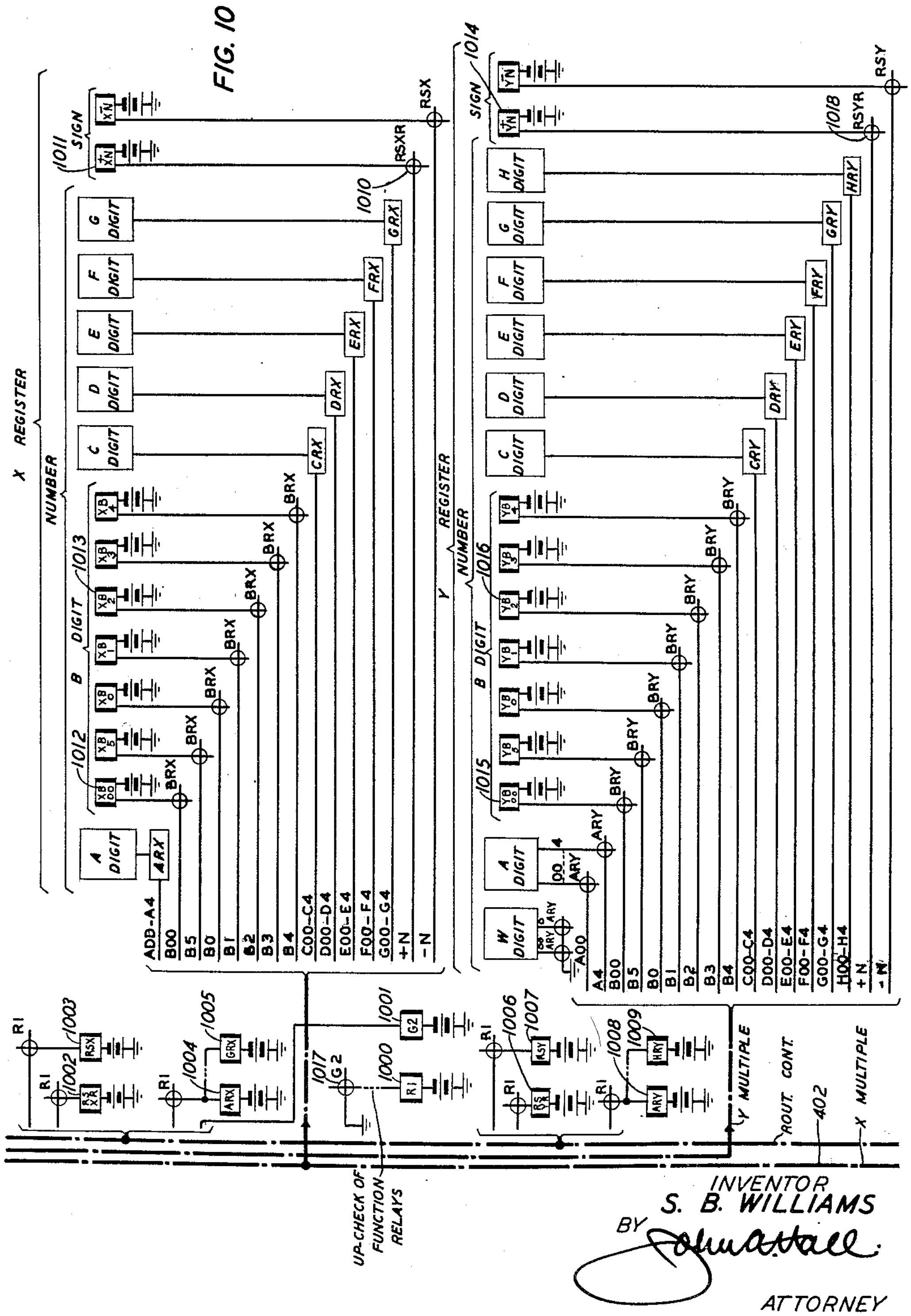
Fig. 10 shows the X and the Y number registers.

In a similar manner the signs of the numbers themselves will be registered in Fig. 10 over the +N conductor through the RSXR contacts 1010 to the +XN relay 1011 and through the +N conductor from the Y multiple through the RSYR contacts 1018 to the +YN relay 1014. For the registration of the digits of the number the seven biquinary relays of the B digit alone are shown, the others being merely indicated. The B digit in each of the assumed cases will be 2 and, therefore, the XB00 relay 1012 and the XB—2 relay 1013 will be operated in the X register and the YB00 relay 1015 and the YB—2 relay 1016 in the Y register will be similarly operated. These relays will be locked in a manner similar to that shown in detail in Fig. 4.

Figure 8:
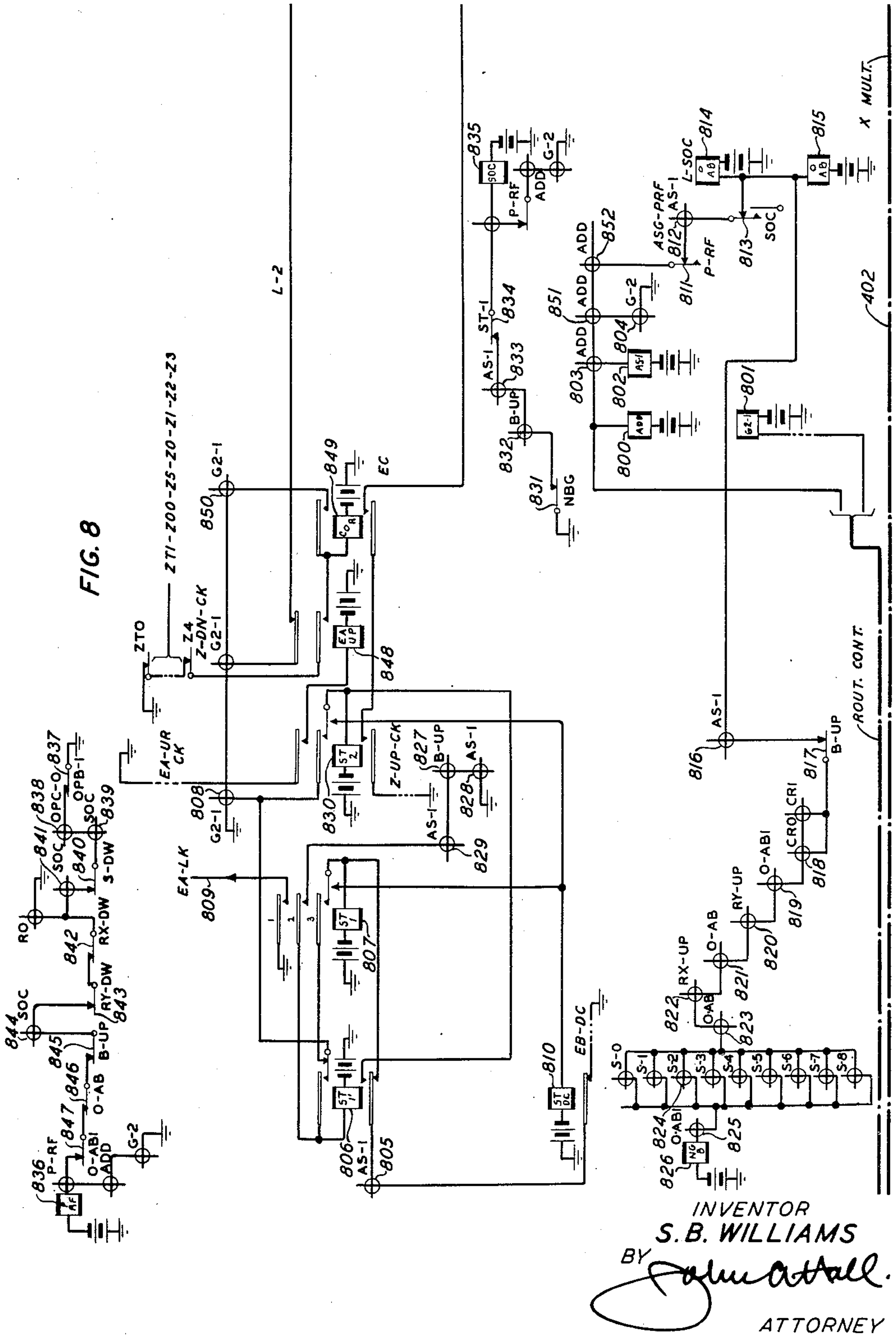
Fig. 8 shows the start circuit operated under control of the routine control circuit.

Turning to Fig. 8 for a moment it will be noted that the ADD relay 800 and the G2—1 relay 801 have been operated in interval 1. Following this, the ADD relay will be locked in through a circuit from ground, G2 contact 804, ADD contact 836 to the winding of the ADD relay 800 and this relay will be maintained operated until the calculator is released. In interval 2 the add and substract AS—1 relay 802 will be operated from ground through the G2 contacts 804, the ADD contacts 803 to the winding of the AS—1 relay 802. It may be noted at this point that in a good many cases where a single relay has insufficient contacts to perform all of its functions, two or more relays are operated in parallel with it and these are generally designated with corresponding letters. Thus, there will be an AS relay as well as an AS—1 relay which, for present purposes, may be taken as one and the same. This is shown also in the case of the 0—AB relays where the 0—AB relay 814 and the 0—AB1 relay 815 are shown as connected in parallel and which will, therefore, operate together. During the third interval, therefore, and after the AS—1 relay 802 has been operated a circuit is extended from ground through the G2 contacts 804, the ADD contacts 851, the ADD contacts 852, the back contacts 811 of the P—RF relay, the AS—1 contacts 812, the back contacts 813 of the SOC (sum on C) relay to the windings of the 0—AB relay 814 and the 0—AB1 relay 815. The 0—AB relays are, therefore, operated during interval 3 along with the relays which connect the transmission conductors of the X and Y multiples to the relays of the X and Y registers. The X and Y registers as described are, therefore, set in interval 4.

*Dismissal of transmission circuits*

Figure 4:
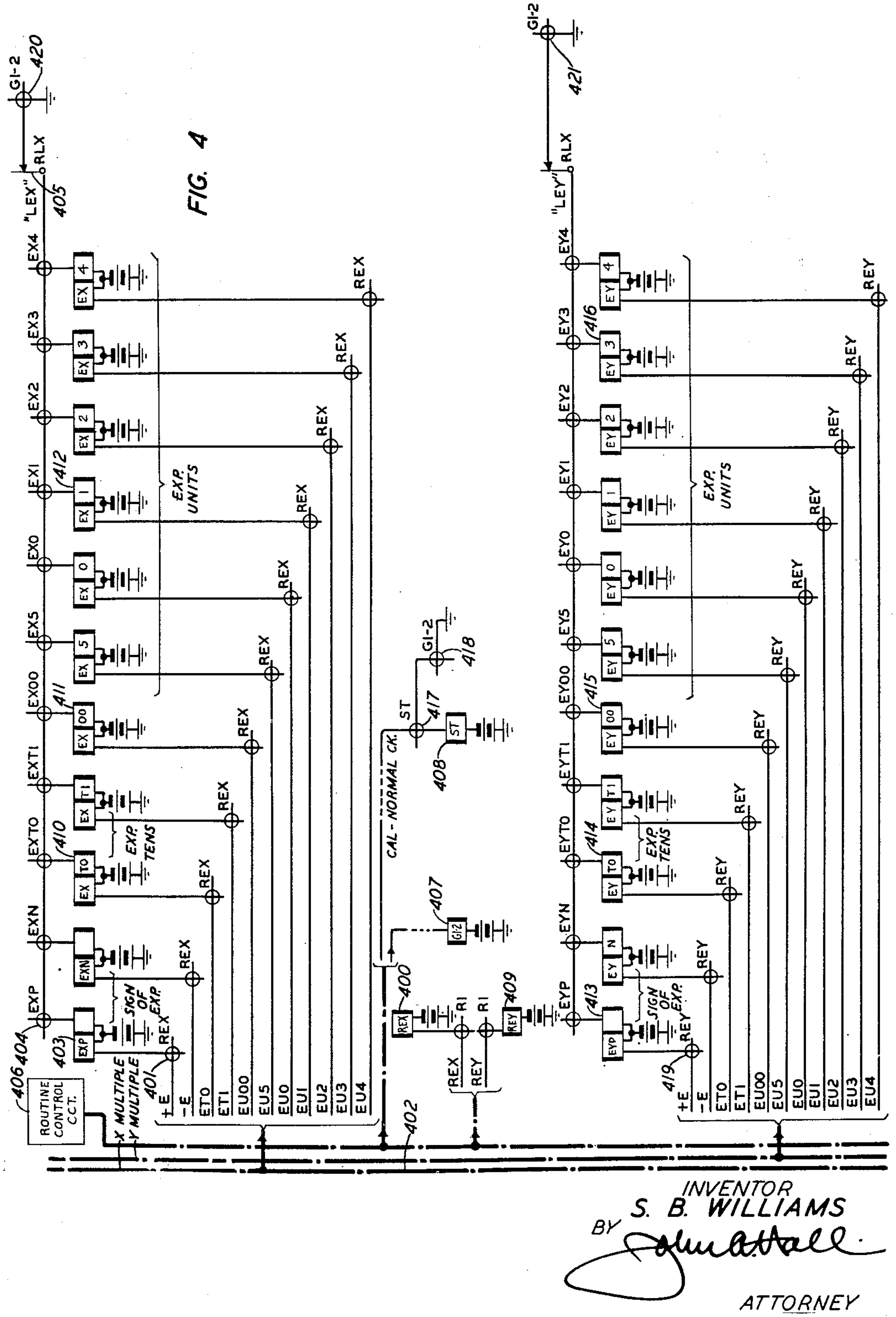
Fig. 4 shows the registers for registering the exponent of a number brought into the calculator over the X multiple and the exponent of a number brought into the calculator over the Y multiple.

When the exponent registers of Fig. 4 and the number registers of Fig. 10, as well as the ADD relays, the ZS relays and the RO relays have operated, then the RI, REX and ARX relays will be dismissed by the routine control circuit leaving only the ground control relays such as the G2 relay 1001, the G2—1 relay 801, the G1—2 relay 407 and the ST relay 804 operated. This function is performed by a complicated set of check circuits with which we are not intimately concerned at present. Each of the registers as well as the main controlling relays will control an up-check circuit. These up-check circuits prove that the registers within the calculator have been properly set. Upon the operation of the X and Y registers the original circuit for the RI relay 1000 is opened and this relay causes the release of the REX relay 400 and others of similar function. A down-check circuit is now made to see that the transmission conductors of the X and Y multiples have been entirely freed both from the registers of the calculator and from the registers from which the numbers have been transmitted. When this down-check circuit proves that the X and Y multiples have been thus properly cleared, a signal will be sent in to the routine control circuit which will thereupon cause the operation of the RN relay 2001. This is shown as operating in the tenth interval and the RI, REX and ARX relays are shown as being released in the seventh interval, the lines to these points being dotted to indicate that the actual time relation to other relay operations in the chart is indefinite and immaterial. This is to indicate that certain other timing intervals may be absorbed in the routine control circuit which are not pictured here. The fact that the read-in relays are shown as releasing in interval 7 and the RN relay is shown as operating in interval 10 is stated to be immaterial since the need for the closure of the contacts of the RN relay does not come until interval 28 as will appear hereinafter (RD relay 2003).

*Start of calculator operation—Determination of algebraically larger number*

Thus, it will be seen that the calculator is freed from the X and Y multiples in interval 7 and the final arrangement for its complete operation is made in interval 10 through the operation of the NR relay 2001. In the meantime the operation of the calculator has started and this may be seen from the circuits shown in Fig. 8. In Fig. 8 a circuit may be traced from ground through the down-check circuit of the EB relays comprising the augend means of the ancillary number calculator shown in Fig. 5, thence through the back contact of the STDC relay 810, the AS—1 contacts 805, the armature and back contact of the ST—1' relay 806 through the winding of the ST—1 relay 807. The ST—1 relay 807 operates in interval 4 and locks in a circuit from ground through the G2—1 contacts 808, the normal contacts of the ST—1' relay 806, the armature 3 and front contact of the ST—1 relay 807. Through this circuit a ground is also extended to the winding of the STDC relay 810 so that this relay becomes operated in the following interval 5. The ST—1 relay 807 provides ground for the locking circuit 809 of the EA relays (Fig. 5) and partially closes a circuit for the operation of the ST—1' relay. Certain of the start relays of Fig. 8 being now operated we may turn for a moment to the control relays of Fig. 7. Herein a circuit may be traced from ground through the EX—1 contacts 700, the EY—2 contacts 701, the EX00 contacts 702, the EY00 contacts 703, the EXT0 contacts 704, the EYT0 contacts 705 to the winding of the YLN relay 706. The operation of the YLN relay is a signal that the exponent registered in the Y register is numerically the larger of the two.

Another circuit may now be traced from ground through the STDC contacts 707, the ST—1 contacts 708, the EXP contacts 709, the EYP contacts 710, the AS—1 contacts 711 to the winding of the XYND relay 713. This last relay is one which will control the transfer of the exponent values to the exponent A and the exponent B registers in a manner not direct, that is, the value entered in the A register will be direct and the value transferred to the B register will be in its complemental form. This is because both of the exponents being positive the smaller must be subtracted from the larger and, therefore, its complement is added. The effect of the operation of the XYND relay will be seen shortly.

Another circuit may now be traced from ground through the EXP contacts 714, the YLA contacts 715 to the SP (sign positive) relay 716. The effect of the operation of the SP relay will be described hereinafter.

Another circuit may now be traced from ground through the AS contacts 717, the YLN contacts 718, the EXP contacts 719, the EYP contacts 720 through the winding of the YLA relay 721. The operation of this relay is an indication that the exponent registered in the Y register is algebraically the larger. These conditions having been established, a circuit may be traced from ground through the XYND contacts 722, the YLN contacts 723 to the YAD relay 724. This relay will control the transmission of the number in the Y exponent register to the A register directly. In a similar manner a circuit is traced from ground through the XYND contacts 725, the YLN contacts 726 to the XBC relay 727. This latter relay will cause the transmission of the exponent in the X register to the B register in its complemental form.

*Transfer of numbers from X and Y registers to B and A registers, respectively*

When the X and Y registers (Fig. 10) have been properly set, each closes its own up-check circuit and each will, therefore, cause the operation of a corresponding relay. Thus, a circuit may be traced from ground through the X—UP contacts 728, the 0—AB contacts 729, the +XN contacts 730, the +YN contacts 731, the YLA contacts 732, the ADD—1 contacts 733, the 0—AB contacts 735 to operate the CR0 relay 736 and also directly to the RYA relay 734. The RYA relay will control the transmission of the number in the Y register to the A register of the calculator and the CR0 relay will cause the grounding of the carry 0 lead into the H digit of the calculator since both numbers being positive and no complement being used in the summation thereof the summation is straightforward and does not require the addition of a carry 1. In a similar manner, a circuit may be traced from ground through the Y—UP contacts 737, the back contacts 738 of a relay designated QR—9′, the 0—AB contacts 739, the YLA contacts 740 to the winding of the RXS relay 741. The RXS relay controls the transmission of the number in the X register to the B register of the calculator.

A locking circuit for the carry relays is indicated as extending from ground through the G2 contacts 742, the ADD contacts 743, the P—RF contacts 744, the AS—1 contacts 745, the CR0 contacts 746 to a winding of the CR0 relay 736. The XBC, YAD, RYA and RXS relays are operated in interval 7.

*Operation of ancillary number calculator*

Figure 5:
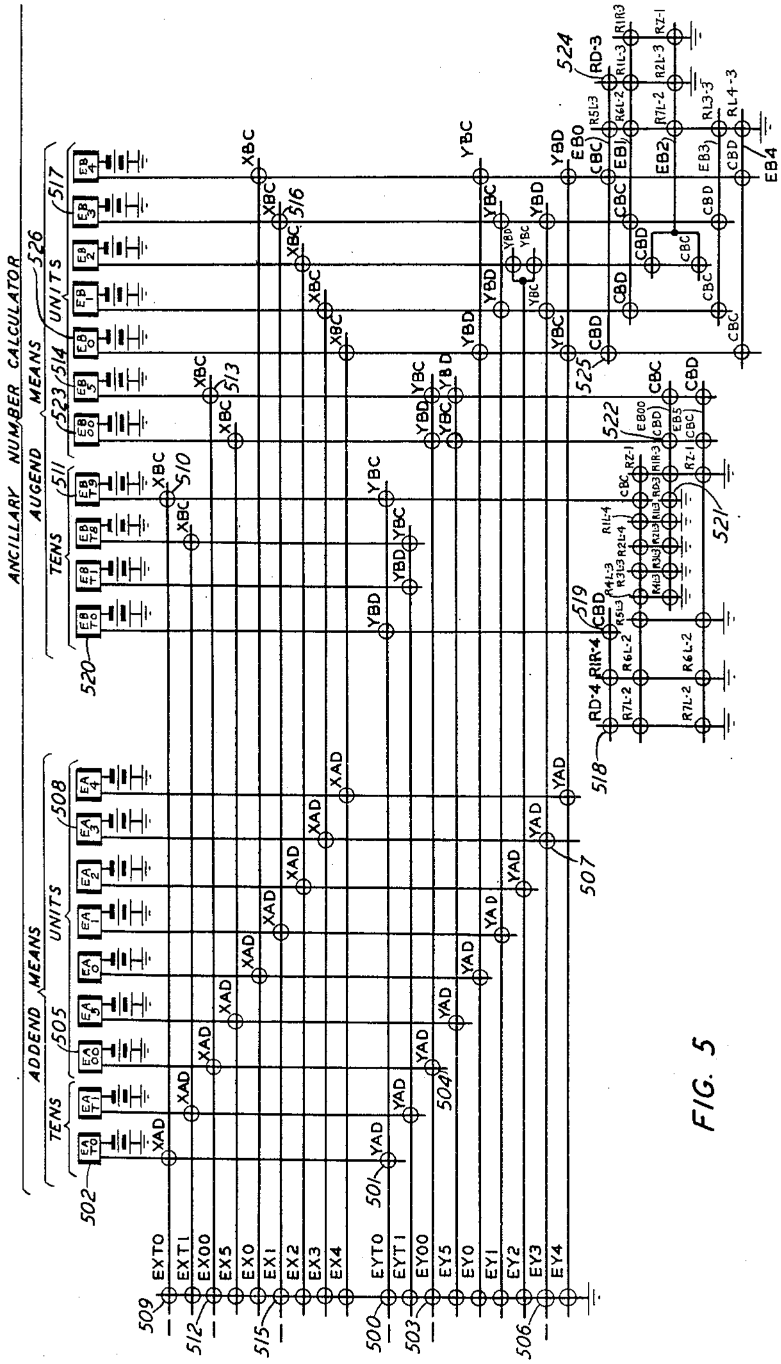
Figs. 5 and 6 show the ancillary number calculator, Fig. 5 showing the addend and augend means and Fig. 6 showing the sum means.
Figure 6:
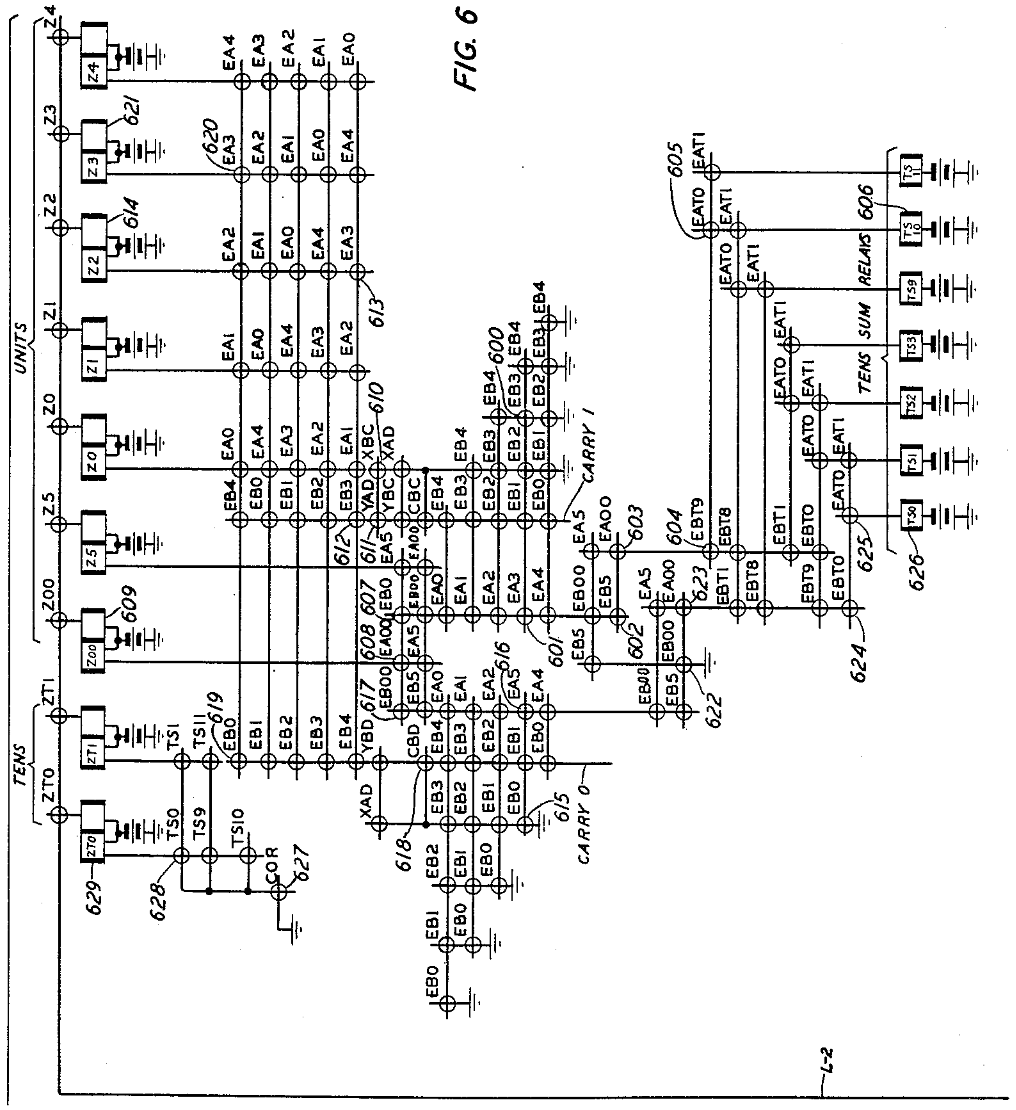
Figure 7:
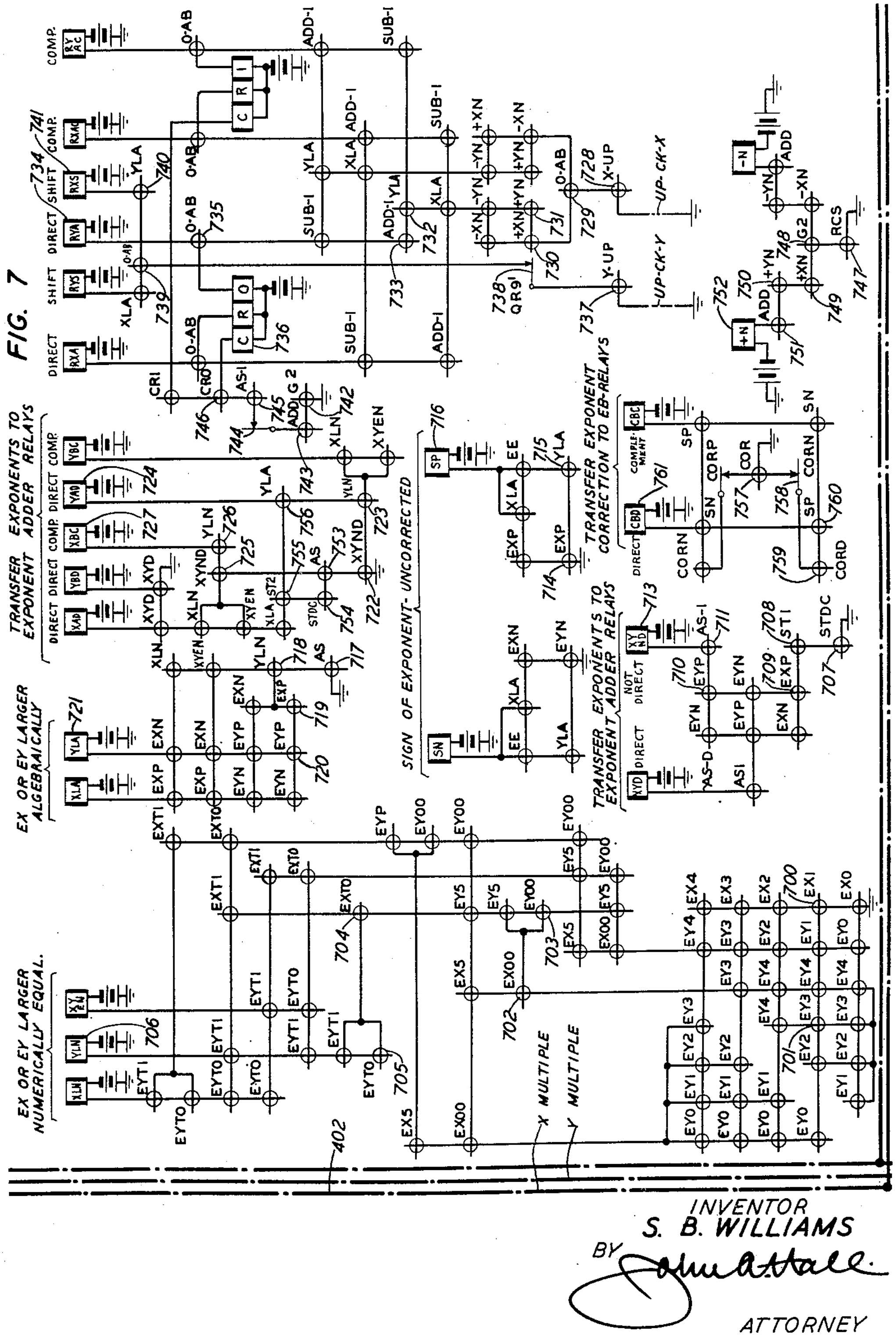
Fig. 7 shows the circuits controlled by the relays of the exponent X and exponent Y registers for determining the route of the numerical values within these two registers to the A and B registers of the ancillary number calculator.

As a result of the operation of the YAD and XBC relays the addend means and the augend means of the ancillary number calculator in Fig. 5 will be operated. A circuit may be traced from ground through the EYT0 contacts 500, the YAD contacts 501 to the EAT0 relay 502. A companion circuit may be traced from ground through the EY00 contacts 503, and YAD contacts 504 to the EA00 contacts 505 and a third similar circuit may be traced from ground through the EY—3 contacts 506, the YAD contacts 507 to the EA—3 relay 508. Thus, the value 03 is registered in the addend means of the ancillary number calculator.

In a similar manner, a circuit may be traced from ground through the EXT0 contacts 509, the XBC contacts 510, the EBT—9 relay 511, from ground through the EX00 contacts 512, the XBC contacts 513 to the EB—5 relay 514 and from ground through the EX—1 contacts 515, the XBC contacts 516, to the EB—3 relay 517. Thus, the value 98 is transferred to the augend means of the ancillary number calculator. This value 98 is the nine's complement of the value 01 which was registered in the X register of Fig. 4. This operation takes place in interval 8 and these values are summed into the Z register in the following interval 9.

The circuits for the operation of the relays of the Z register may be traced as follows: First, a circuit is traced from ground, the EB—3 contacts 600, the EA—3 contacts 601, the EB—5 contacts 607, the EA00 contacts 608, to the winding of the Z00 relay 609. Another circuit may be traced from ground through the XBC contacts 610, the YAD contacts 611 over the carry 1 conductor through the EB—3 contacts 612, the EA—3 contacts 613 to the Z2 relay 614. Another circuit may be traced from ground through the EB—3 contacts 600, the EA—3 contacts 601, the EB—5 contacts 602, the EA00 contacts 603, the EBT—9 contacts 604, the EAT0 contacts 605, to the TS—10 (ten's sum 10) relay 606. Thus, the Z register is operated to record the value 02 as being the sum of the value 03 from the Y exponent register, the value 98 the complement of the value 01 in the X exponent register and the carry 1 automatically provided when the augend appears as a complement. It, therefore, appears that the exponent value 01 of the number transmitted over the X multiple subtracted from the value 03, the exponent of the number transmitted over the Y multiple is 02. The Z relays are operated in interval 9 and this will cause in the following interval a certain one of the shift relays to be operated. This may be followed from a circuit traced from ground through the 0—AB contacts 900, the ST—1 contacts 901, the TS—10 contacts 902, the Z00 contacts 903, the Z2 contacts 904 to the S2 relay 905. This S2 relay will control the shifting of the number to be transferred from the X register (Fig. 10) to the B register two places to the right.

*Regular calculator start*

It may be noted at this point as a matter of sequence that a circuit may be traced from ground through the G2 contacts 906 to operate the RCS relay 907 through a circuit which is here shown as dotted and which represents a number of contacts in the calculator provided by certain relays not shown herein. The RCS is known as the regular calculator start and provides a check that the operation proposed is a regular or normal one capable of being solved. By way of example, this circuit will be opened if, for instance, an exponent of +19 or larger is registered in either of the exponent registers of Fig. 4. If everything is in proper order, therefore, the RCS relay 907 will operate in interval 5 and following this a circuit will be closed from ground through the RCS contacts 747, the G2 contacts 748, the +XN contacts 749, the +YN contacts 750, the ADD contacts 751 to the +N relay 752. This is part of the sign circuit and will be sufficient for the description of the present simple problem. Actually, this sign circuit is far more extensive and complicated than shown here but the portion thereof which is shown will suffice for the present purposes. The +N relay 752, therefore, follows the operation of the RCS relay in interval 6.

In the same manner that the values in the X and Y exponent registers (Fig. 4) are transferred to the B and A registers of the ancillary number calculator, respectively, the number registered in the Y number register of the calculator (Fig. 10) is transferred to the A register of the calculator in interval 8. This operation may be illustrated by describing the setting of the B digit of the A register. A ground is extended through the G2 contacts 1100, the RYA contacts 1101, the YB00 contacts 1102 to the AB00 relay 1103. Similarly, a ground is extended through the G2 contacts 1100, the RYA contacts 1104, the YB—2 contacts 1105 to the winding of the AB—2 contacts 1106. Thus, the value 02 is registered in the A relays of the B digit. Similarly, the values 001234567 and 0 will be registered in the P, W, A, B, C, D, E, F, G and H digits of this adder A register. The A register is thus set in interval 8.

At the end of interval 8 the up-check circuits for the EA relays, the EB relays and A relays are closed.

It has been described how the shift relay 905 was operated in interval 10. Following this, a circuit for the number ground for the B relays is closed. In a circuit traced from the windings of the 0—AB relays 814 and 815 through the AS—1 contacts 816, the back contacts 817 of the B—UP relay (a relay responding to the up-check circuit of the B relays), through the CR0 contacts 818, the 0—AB1 contacts 819, the RY—UP contacts 820 (responding to the up-check circuit of the three RY relays including RYA relay 734), the 0—AB contacts 821, the RY—UP contacts 822 (responding to the up-check circuit of the three RX relays including the RXS relay 741), the 0—AB contacts 823, the S2 contacts 824, the 0—AB1 contacts 825 to the NG—B relay 826. The NG—B relay, therefore, operates in interval 11.

As a matter of sequence it may be noted at this time that the PR0 relay 2004 is operated also in interval 11 following the operation of the RN relay 2001 in interval 10. The circuit for the PR0 relay may be traced from ground through the G2 contacts 2005, the RN contacts 2006 to the PR0 relay 2004. The PR0 relay is a relay which prepares the circuit for the round-off operation.

The relays of the B register are now operated. A ground may be traced through the NG—B contacts 1600 through the contacts of the S2 relay generally noted here as being supplied over the conductor 1601 through the S2 contacts 1700 to the BB00 relay 1702 and also through the S2 contacts 1701 to the BB0 relay 1703. Thus, although the value 2 was registered in the B digit of the X register, the effect of this is to register the value 0 in the B digit of the B register. The value 1 which is registered in the A digit of the X register will be transferred by the operation of the NG—B contacts 1300, operating over the path 1307 through the contacts of the S2 relay 1502 to operate the B relays of the C digit shown in Fig. 18. The value 2 registered in the X register will be transferred by the extension of ground through the NG—B contacts 1300, the RSX contacts 1301, the B00 contacts 1302 to the S00 conductor 1303 and similarly through the RSX contacts 1304, the B2 contacts 1305 to the S2 conductor 1306. The S00 conductor 1303 and the S2 conductor 1306 will be switched by the S2 relay to the B relays of the D digit, not shown here but clearly indicated by the pattern of the shift relays shown in Figs. 13 to 18, inclusive. In this manner, the value 0000123456 will be registered in the P, W and A to H digits of the B register, respectively. This will occur in interval 12 following the operation of the NG—B relay in interval 11.

It may also be noted here that the operation of the NG—B relay in interval 11 closes a circuit through the NG—B contacts 1503, the 0—AB1 contacts 1504 to operate the S—B0 relay 1505 in interval 12.

Since the B relays have been operated in interval 12 this will be followed providing correct operation has taken place by the closure at the end of interval 12 of the B up-check circuit and, therefore, the operation of the B—UP relay in interval 13. We are now ready to undertake the summing operation.

*The summing operation*

The calculator comprises three registers, the A, B and C registers and each of these has ten decimal denominational places known as the P digit, the W digit, the A, B, C, D, E, F, G and H digits. In the drawing herein only the B digit is shown in full since the operation of summing is the same in each digit. There are shown in these drawings certain differences in the P digit, the W digit and the H digit.

The P digit is known as a polarity means and is used for the purpose of calculating signs, a 0 in this place indicating plus and a 9 indicating minus. The W digit is an overflow decimal denominational order and is used to record a carry when the sum of the numbers in the A and B digits exceeds 9. The H digit is an extra digit to the extreme right used for the purpose of providing means for rounding off numbers more accurately. Anticipating the description of the operation of the relays, the sum about to be taken will appear as:

0012345670
0000123456
——————
0012469126

Actually, this sum will be rounded off to 0012469131 and will be read out as 1246913.

As an illustration of the use of the P digit, let us assume that the number 1230000 is to be subtracted from the number 1234567. This being done by complemental addition, the sum will then appear as:

0012345670
9987699999
1
——————
0000045670

The sum, therefore, contains a 0 in the P digit indicating that the result is positive in nature. If, on the other hand, the value 2 was to have been subtracted from the value 1234567, then the addition would appear as follows:

0012345670
9979999999
1
——————
9992345670

—007654320

The last line is a translation of the sum. Thus, the 9 in the P digit represents minus. It is believed that the use of the W digit as an overflow decimal denominational order is obvious and that no particular explanation of this is needed.

The calculator is known as a two-cycle calculator, the A register acting as an augend means and the B and C registers acting alternately as addend and sum means, respectively. Thus, as in the description of Fig. 2 it was brought out that the sum is first taken with the A register acting as an addend means, the B register as an augend means and the C register as a sum means. The sum calculated and locked in on the C relays is then held and the round-off operation is performed by releasing the value in the A register and placing therein instead the value 5 in the last right-hand denominational place and summing the values now in the A and C registers into the B register.

The B relays now having been operated will be locked in. From a timing chart it will be noted that in interval 13 the LB lead for locking the LB relays is grounded. As shown particularly in Fig. 17 where the BB00 relay 1702 and the BB0 relay 1703 have been operated, ground on the LB lead 1704 will be extended through the BB0 contacts 1705, the BB0 contacts 1706, the BB00 contacts 1708 and the BB00 contacts 1709 to the outgoing portion of the B locking lead.

One intimate circuit detail should be noted at this point. The incoming LB lead 1704 is the lead for locking the B relays which have been operated. The ground incoming over this lead will be extended through two contacts controlled by each of the relays before it is advanced to the next. This locking circuit comprising a series arrangement on every one of the B relays which has been operated is in itself an up-check circuit for no relays in a succeeding point in the chain may be operated unless every relay prior to it in the chain has been properly operated and properly locked.

At the beginning of the chain and for use through the C to H digits the LB lead 1808 is grounded by the HB relay 1807. A circuit may be traced from ground through the NG—B contacts 1808, the RXS contacts 1806 to a winding of the HB relay 1807. This relay operates and extends the ground on the LB lead 1800 over the HB contacts 1830 and the HB contacts 1831 to the LB lead 1808 which extends to the B relays of the H digit is extended by them to the B relays of the next digit and so on. The outgoing LB lead from the C digit will then extend through the AS contacts 1832 to the CUL—1 relay 1804 and will cause this relay to operate. There are in all four of these CUL relays known as CUL, CUL—1, CUL—2 and CUL—3 and all four will be operated when the B digits of all the ten decimal denominational orders have been properly operated.

A circuit is now established from ground through the CUL contacts 1825 to operate the CUL—G relay 1833 and in parallel therewith the OPB—0 relay 1813. It may be noted that upon the operation of the G2 relay a circuit is apparently set up from ground through the G2 contacts 1834 to the conductor leading to the windings of the CUL—G relay and the OPB—0 relay. However, another circuit is simultaneously closed from ground through the G2 contacts 1810, the back contacts of the BUL—2 relay 1811 to the winding of the B—B0 relay 1812. The B—B0 relay is a slow releasing relay and will not return to normal under the normal operating conditions of the BUL—2 relay even though this apparently extends over a fair number of intervals. The B—B0 relay is used for certain emergency purposes with which we are not at this time concerned so that, therefore, the CUL—G relay and the OPB—0 relay are in effect directly responsive to the CUL contacts 1825.

Let us now for a moment return to the start circuit in Fig. 8. Upon the operation of the B—UP relay in interval 13 a circuit is established from ground through the AS—1 contacts 828, the B—UP contacts 827, the AS—1 contacts 829, the front contact and armature 2 of the ST—1 relay 807 to the winding of the ST—1' relay 806. This relay responds and by opening the locking circuit for the ST—1 relay releases both the ST—1 and the STDC relays in interval 14. Also the energization of the NG—B relay 826 depending as it does on the released condition of the B—UP relay responds by releasing in interval 14 as the B—UP relay operates in interval 13. With the ST—1' relay 806 operated and the STDC relay 810 released the ST—2 relay is now placed in a circuit awaiting the release of the EB relays and the closure of the EB down-check circuit. This operation will be described in due time.

Upon the release of the NB—G relay a circuit for the SOC relay is closed from ground through the NB—G back contacts 831, the B—UP contacts 832, the AS—1 contacts 833, the ST—1 back contacts 834 to the winding of the SOC relay 835. The operation of the SOC relay closes a circuit from ground through the CUL—G contacts 1506, the CUL—3 contacts 1507, the SOC contacts 1508 to the winding of the S—CR relay 1509, thus causing the operation of this relay and these two relays together will close a circuit from the OPC lead through the S—CR contacts 1510, the SOC contacts 1511, the RO contacts 1512 to the winding of the CROS relay 1513. The manner in which the OPC lead 1824 is grounded several intervals later will be described shortly. In the meantime, the CROS relay 1513 locks through its own contacts 1514 to the LC lead which at that time will again be grounded and will remain grounded until the calculator is released.

Looking at Fig. 8, it will be seen that upon the opening of the SOC back contacts 813 that the 0—AB relay 814 and the 0—AB1 relay 815 will be released, this operation taking place in the following interval 16. As a result of this, both the RYA and RXS relays release in the following interval 17. The STDC relay having released in interval 14 causes the release of the XYND relay 713 in interval 15. The S relays for shifting the quantity going into the B register are released in interval 17 following the release of the 0—AB relay.

The circuit is now prepared for summing the quantities in the A and B registers into the C register. This operation may be seen in Fig. 21 where the circuit for the CUL—G relay 1210 (the same as the CUL—G relay 1833) is shown. Upon the operation of the CUL—G relay a circuit is extended from ground through the CUL—G contacts 2105, the CUL contacts 2108, the SOC contacts 2109 to a number of relays here shown in a horizontal row such as the CR relay 2110. In like manner the positive relays such as the CP relay 2115 are operated as well as the CK relays such as the CK relay 2118. These are known as the C switching relays and are grouped together under that heading on the sequence chart so that this shows the C switching relays as operating in interval 15 (CUL—G operated in interval 14). A circuit may now be traced from ground, the CUL contacts 1835, the C back contacts 1836 representing the down-check circuit for the C register, the CR contacts 1838 representing the up-check circuit for the C switching relays, the BR back contacts 1837 representing the down-check circuit for the B switching relays to the winding of the OPC—2 relay 1815. The OPC—2 relay operates in interval 16. Following this a circuit is established from ground through the OPC—2 contacts 1816 to the winding of the OPC—3 relay 1817 and the OPC—3 relay responds in the next interval 17. Again following this a circuit may be traced from ground through the BC9 contacts 1818, the OPC—3 contacts 1819 to a relay winding here designated 1820 and representing in parallel the windings of four relays, the OPC, OPC—1, OPCS and the OPCL. It may be explained at this point that these relays are of a particular nature about to respond very rapidly and to close and open a circuit carrying a heavy current but having but a single armature with its front and its back contact. The reason for the use of such a relay is that the OPB and the OPC leads used for operating the B and the C relays have to supply a comparatively heavy current since they extend into every decimal denominational order. The OPC—2 relay operates in interval 17, the OPC—3 in interval 18 and the OPC relay with its companions operates in interval 19. At the end of this interval the LC lead which was opened at the end of interval 16 is again grounded and the OPC lead is grounded to operate the C relays. This circuit may be traced from ground through the OPB—1 back contacts 1821, the OPC—0 back contacts 1822 and the OPC contacts 1823. Therefore, in the following interval 19 the C relays will be operated. This may be described as follows: Ground on the OPC lead 1824 will be extended through the CR0 contacts 1500 to the BC0 lead 1501. This is the carry-in zero lead to the last right-hand decimal denominational order and in accordance with the known operation of the biquinary relay circuits will result not only in the summing of the quantities expressed in the A and B registers of this denominational order but will also result in the extension of ground to a similar carry-out lead. Therefore, each decimal denominational order will be activated by a ground appearing on one of its carry-in leads and will in turn activate a carry-out lead to the next higher decimal denominational order. We may thus go to Fig. 14 and describe the summing of the quantities therein. A 2 will have been expressed in the A digits and a 0 in the B digits and, therefore, the A00, the A2, the B00 and B0 contacts will have been closed. A ground coming in over the carry 0 lead 1400 (the sum in the next right-hand denominational order will have been 3+1=4 and will, therefore, have activated its carry-out zero lead) will be extended through the CR contacts 1401, the B0 contacts 1402, the A2 contacts 1403, the CR contacts 1404 to the winding of the BC2 relay 1711. Another circuit may be traced from ground over the OPC lead 1824, the CK contacts 1405, the A2 contacts 1406, the B0 contacts 1407, the CK contacts 1408, the B00 contacts 1409, the A00 contacts 1410, the CR contacts 1411, the CP contacts 1412 to the winding of the BC00 relay 1712 whereby the sum 2 is expressed in the C relays of this B digit or denominational order. The ground on the OPC lead 1824 is also extended through the CK contacts 1413, the B00 contacts 1414, the A00 contacts 1415 to the BC0 outgoing carry 0 lead 1416. In a similar manner each of the other groups of C relays in each of the other decimal denominational orders will be operated and the sum 0000123456 will be expressed on the P, W and A to H digits. The C relays thus operate in interval 19 and hence the BUL relays follow in interval 20 with the BUL—G relay operating in interval 21 whereupon the ground is removed from the LB lead to release the B relays.

It has hereinbefore been noted that the XYND relay 713 was released in interval 15. This, therefore, causes the release in the following interval 16 of the XBC and YAD relays and since these relays release, the relays of the addend means and the relays of the augend means of the ancillary number calculator are released. When the EB relays have been completely released a circuit is established from ground through the EB down-check circuit, the back contact and armature of the STDC relay 810, the AS—1 contacts 805, the armature and front contact of the ST—1' relay 806, the winding of the ST—2 relay 830 to battery so that this relay now operates in interval 18 in response to the release of the EB relays in interval 17. The operation of the ST—2 relay assures the operation of the STDC relay again in interval 19. Upon the operation of the STDC relay a circuit is established from ground through the AS contacts 753, the STDC contacts 754, the ST—2 contacts 755, the YLA contacts 756 to again operate the YAD relay 724, this occurring in interval 20. It is to be noted that at this time the YAD relay only is operated and that the XBC relay is not operated. This is for the purpose of again placing in the addend means of the ancillary number calculator the value 03 the larger of the exponents of the two numbers being summed. Therefore, the EA relays will again be operated in the same pattern in interval 21.

*The round off*

The sum of the values in the A and B registers having been taken, the circuit will be prepared for round-off in the following manner:

When at the end of interval 21 the BUL—G relay 2100 is fully released the ground is removed from the LB lead 1808 as a consequence of which the B relays which have been held locked to this conductor are released. At the same time the CUL relays such as the CUL—1 relay 1804 and the CUL—2 relay 1603 are also released. The B relays and the CUL relays release during interval 22 and the CUL—G relay releases during interval 23. The OPB—0 relay 1813 in parallel with the CUL—G relay is also released in this interval 23. Due to the release of the CUL relays the C switching relays such as the CR relay 2110, the CP relay 2115 and the CK relay 2118 are released in interval 23 and the B switching relays are operated.

Figure 9:
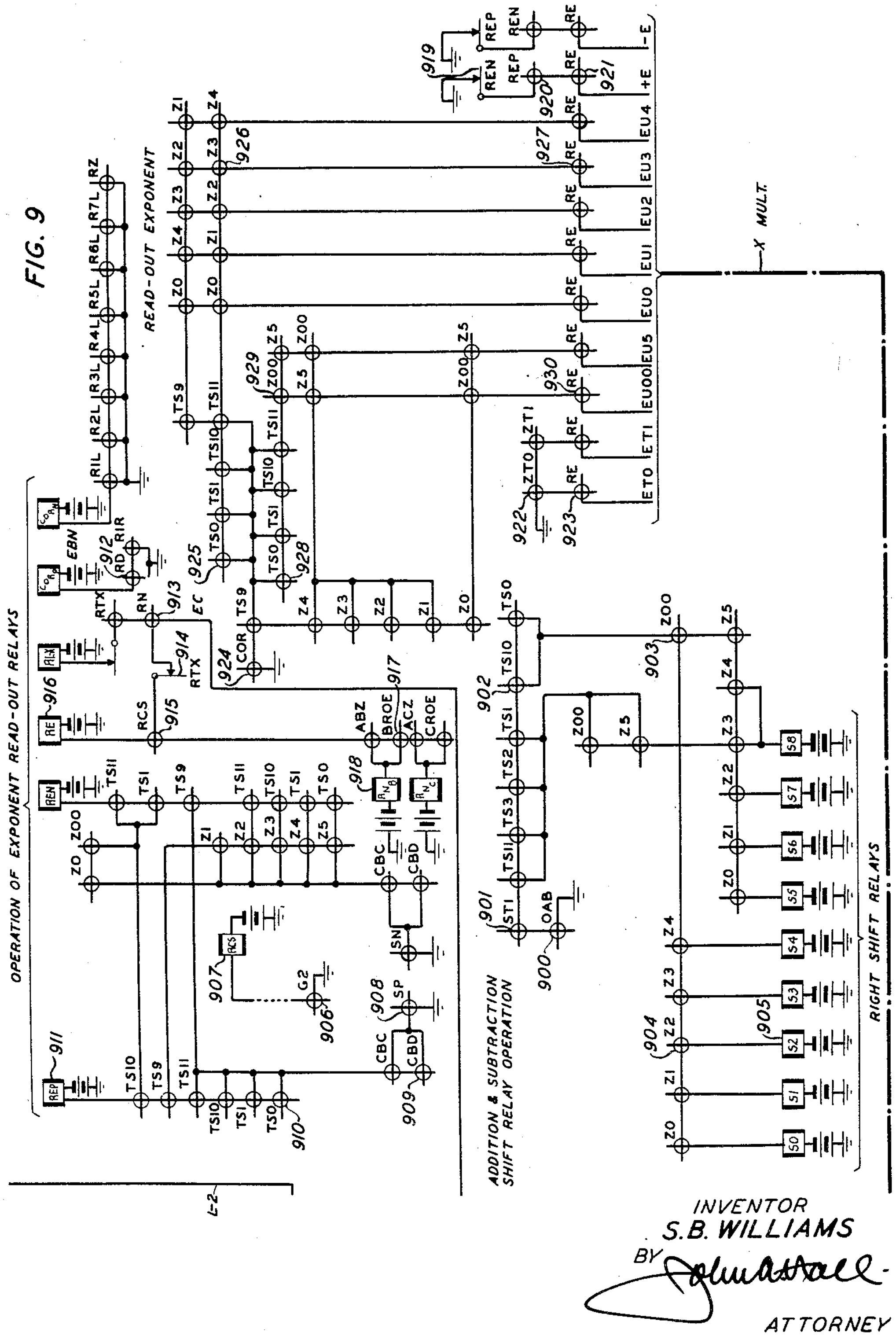
Fig. 9 shows the control of the shift relays whereby two numbers in the main calculator are lined up in accordance with their decimal points.

A circuit may now be traced for the operation of the P—RF relay 836 starting from ground and extending through the OPB—1 back contacts 837, the OPC—0 contacts 838, the SOC contacts 839, the S—DW back contacts 840 which represent the down-check circuit for the S relays shown in the lower left-hand portion of Fig. 9 and including the S2 relay 905, the SOC contacts 841, the RX—DW back contacts 842 which represent a down-check circuit for the relays RXA, RXAC and RXS (Fig. 7), the RY—DW back contacts 843 which similarly represent the down-check circuit for the relays RYS, RYA and RYAC (Fig. 7), the SOC contacts 844, the B—UP back contacts 845 closed now that the B relays have released, the 0—AB contacts 846, the 0—AB1 contacts 847 to the winding of the P—RF relay 836.

Since the B relays released in interval 22 and the B—UP relay responsive thereto released in the next interval 23, the P—RF relay 836 operates in interval 24. The locking circuit for the SOC relay 835 and the CR0 relay 736 is controlled by the P—RF relay, then it follows that the SOC and the CR0 relays will release in interval 25.

Figure 11:
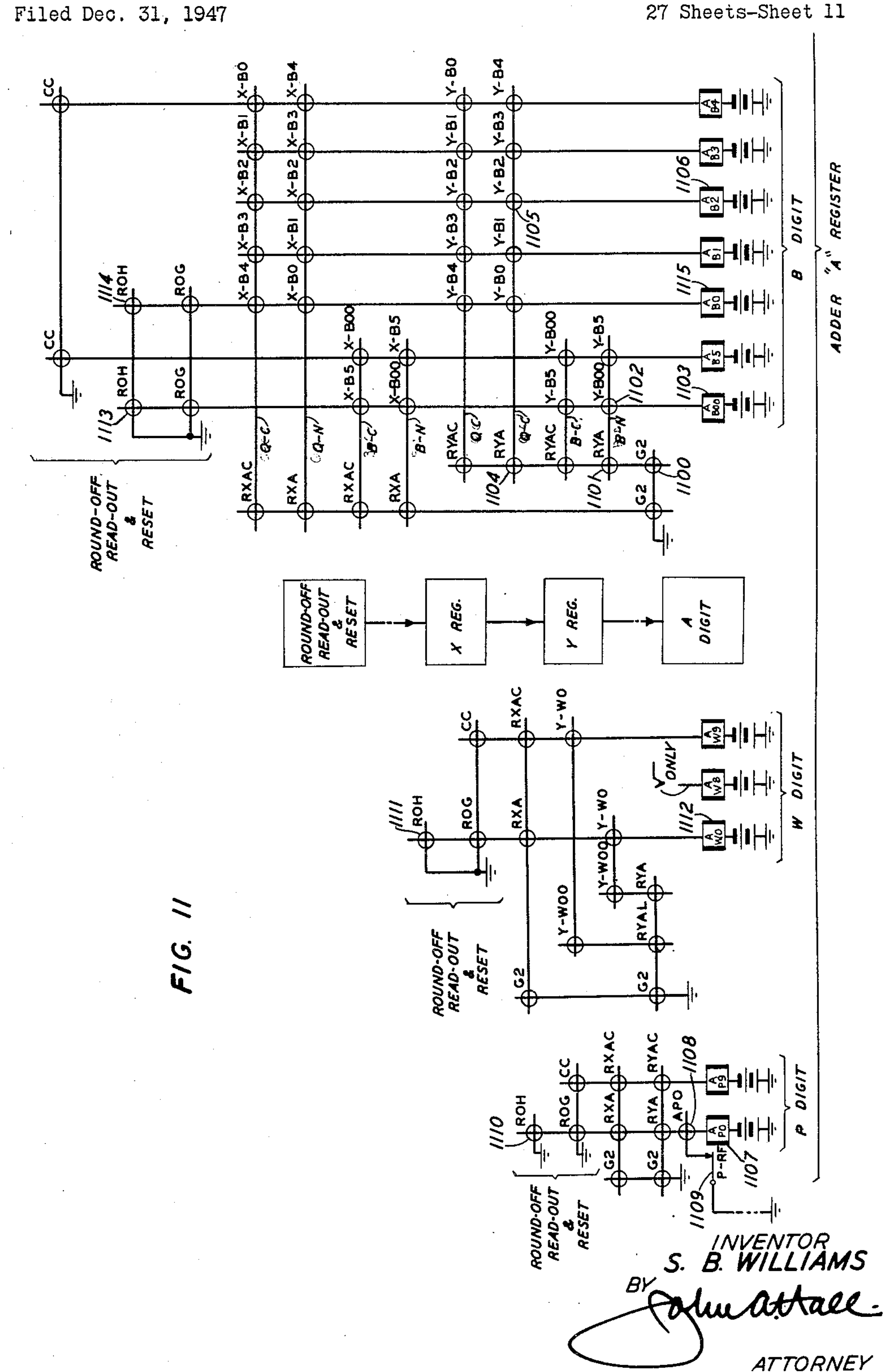
Figs. 11 and 12 show the A register of the calculator, Fig. 11 showing the P, W, A and B digits or decimal denominational orders and Fig. 12 showing the C to H digits or decimal denominational orders, inclusive.
Figure 12:
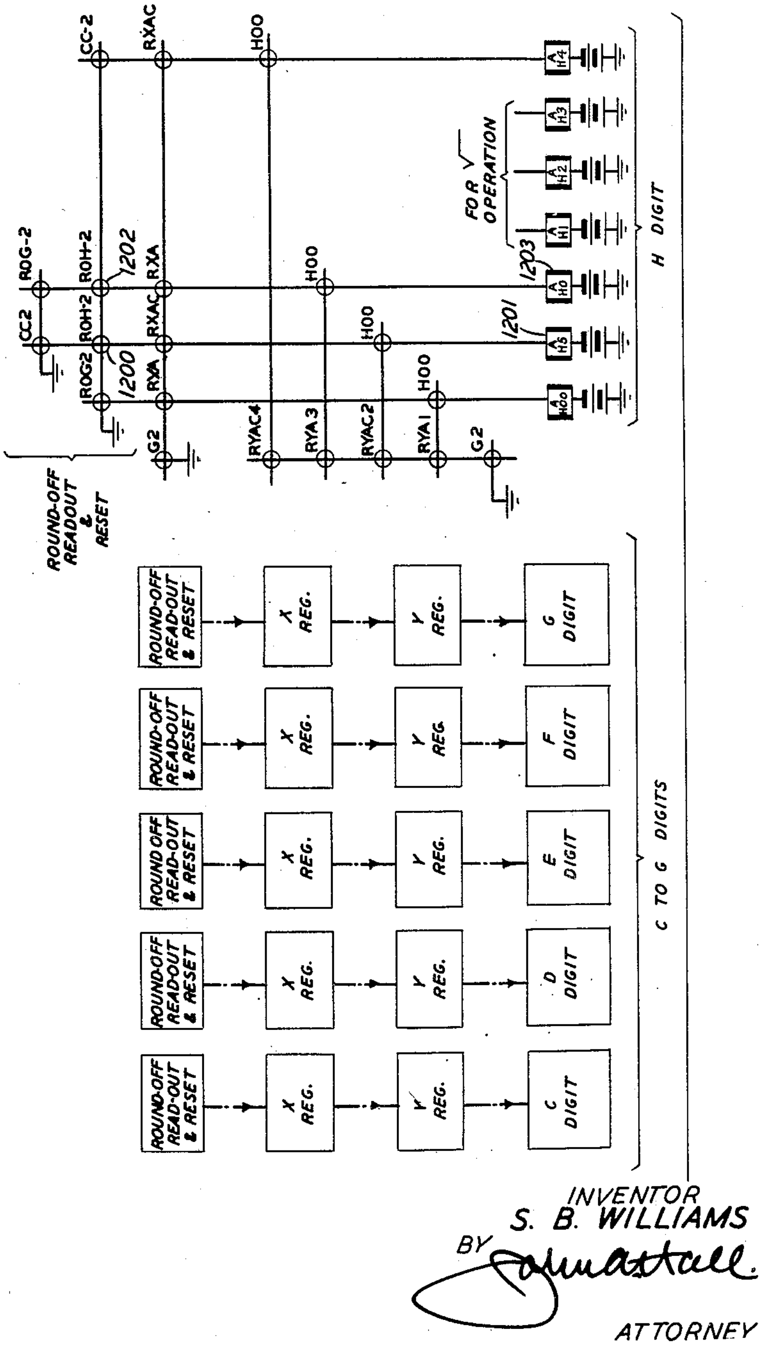
Figure 13:
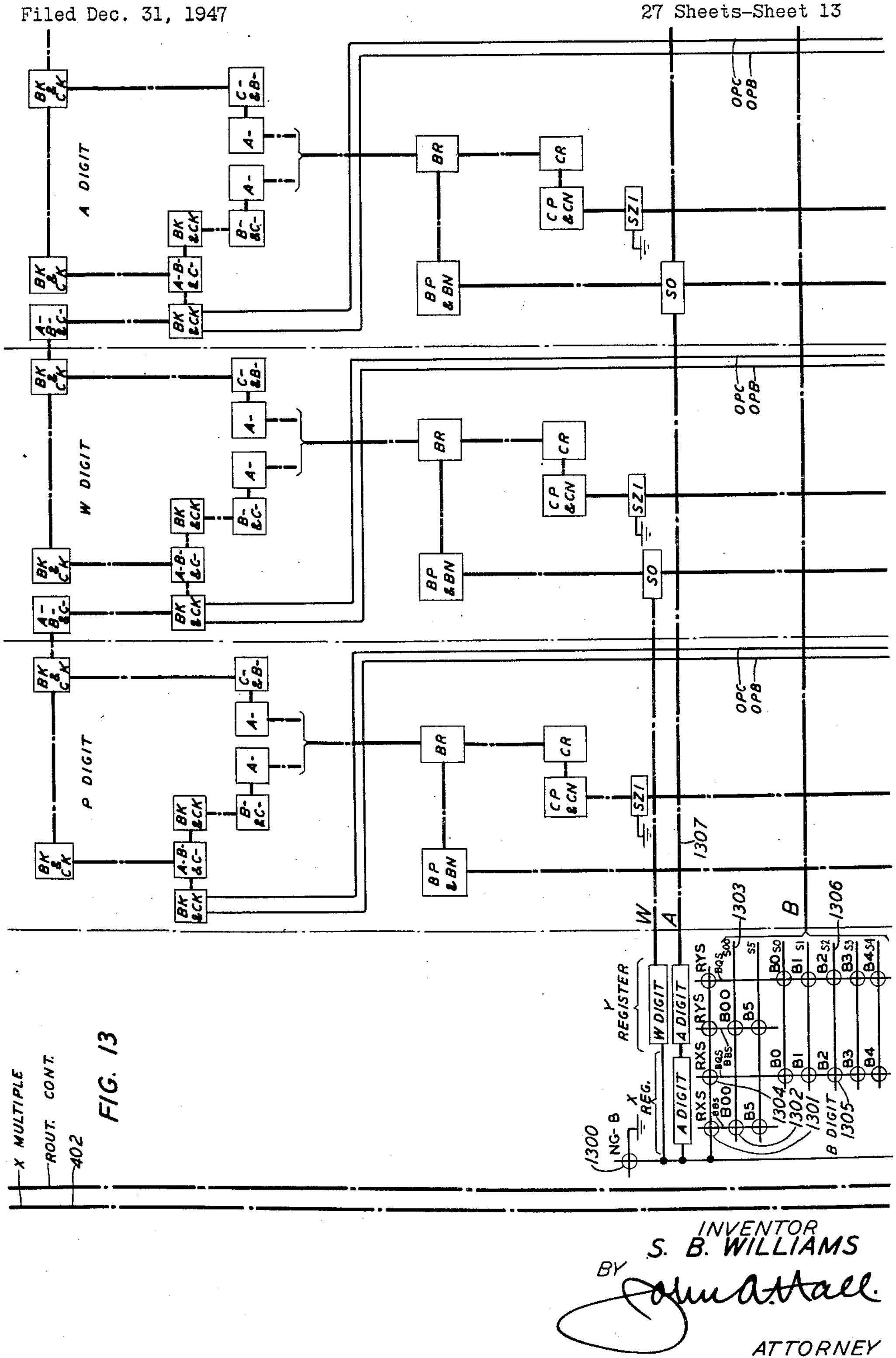
Figs. 13, 14 and 15 show the carry circuits of the calculator, Fig. 13 indicating the P, W and A digits and Fig. 14 showing in full the B digit and Fig. 15 indicating the C to the H digits.
Figure 14:
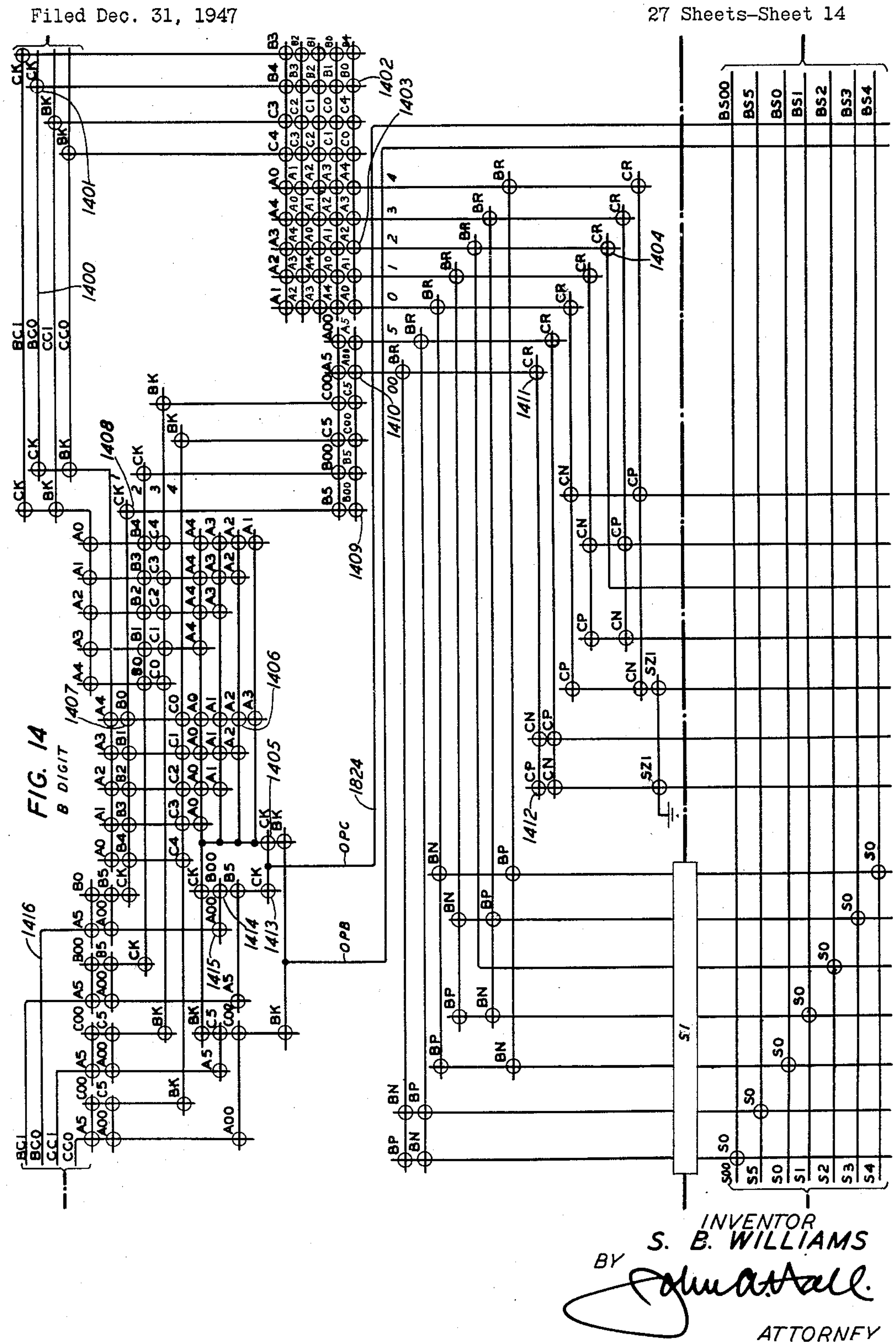
Figure 15:
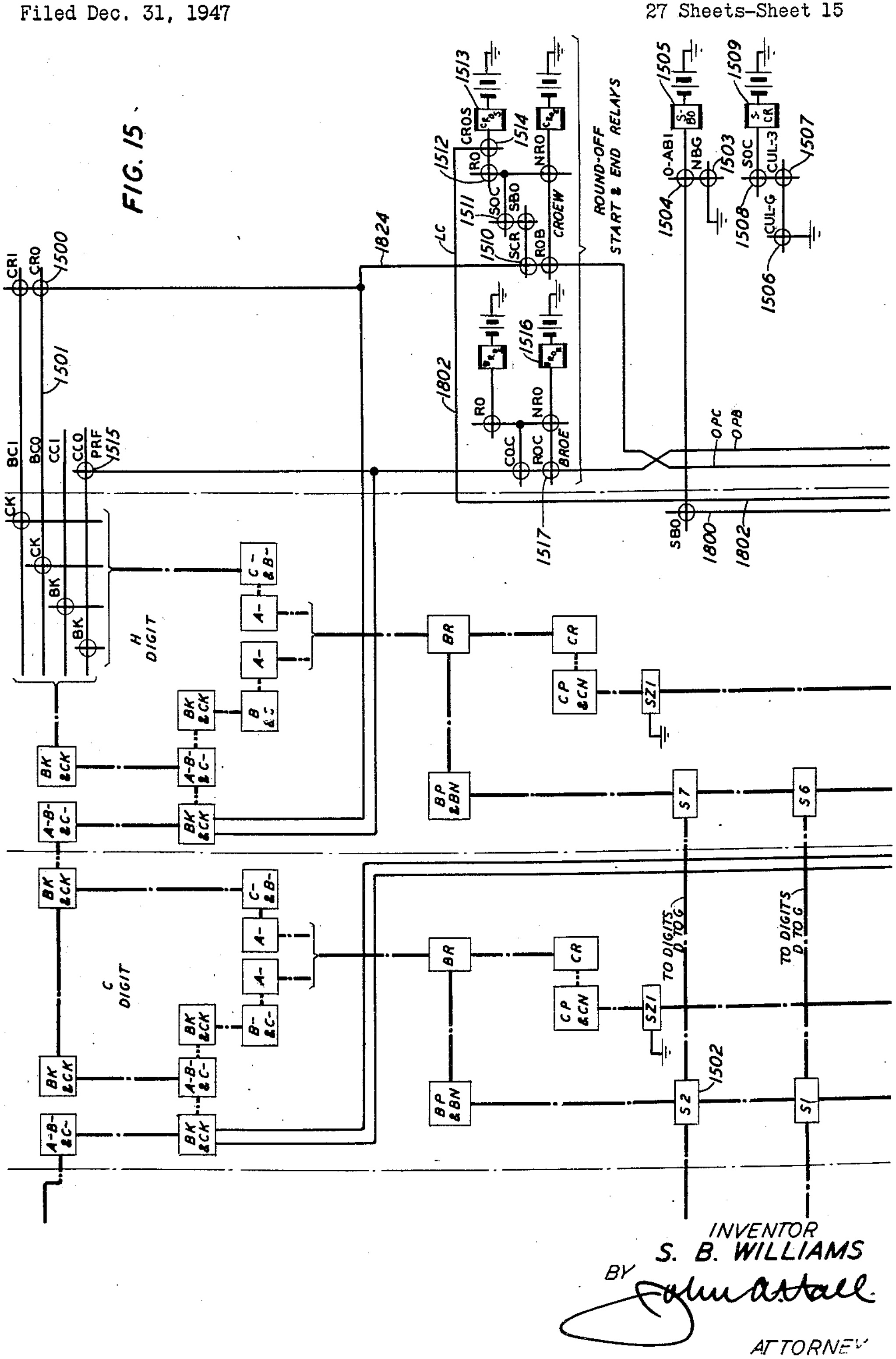
Figure 16:
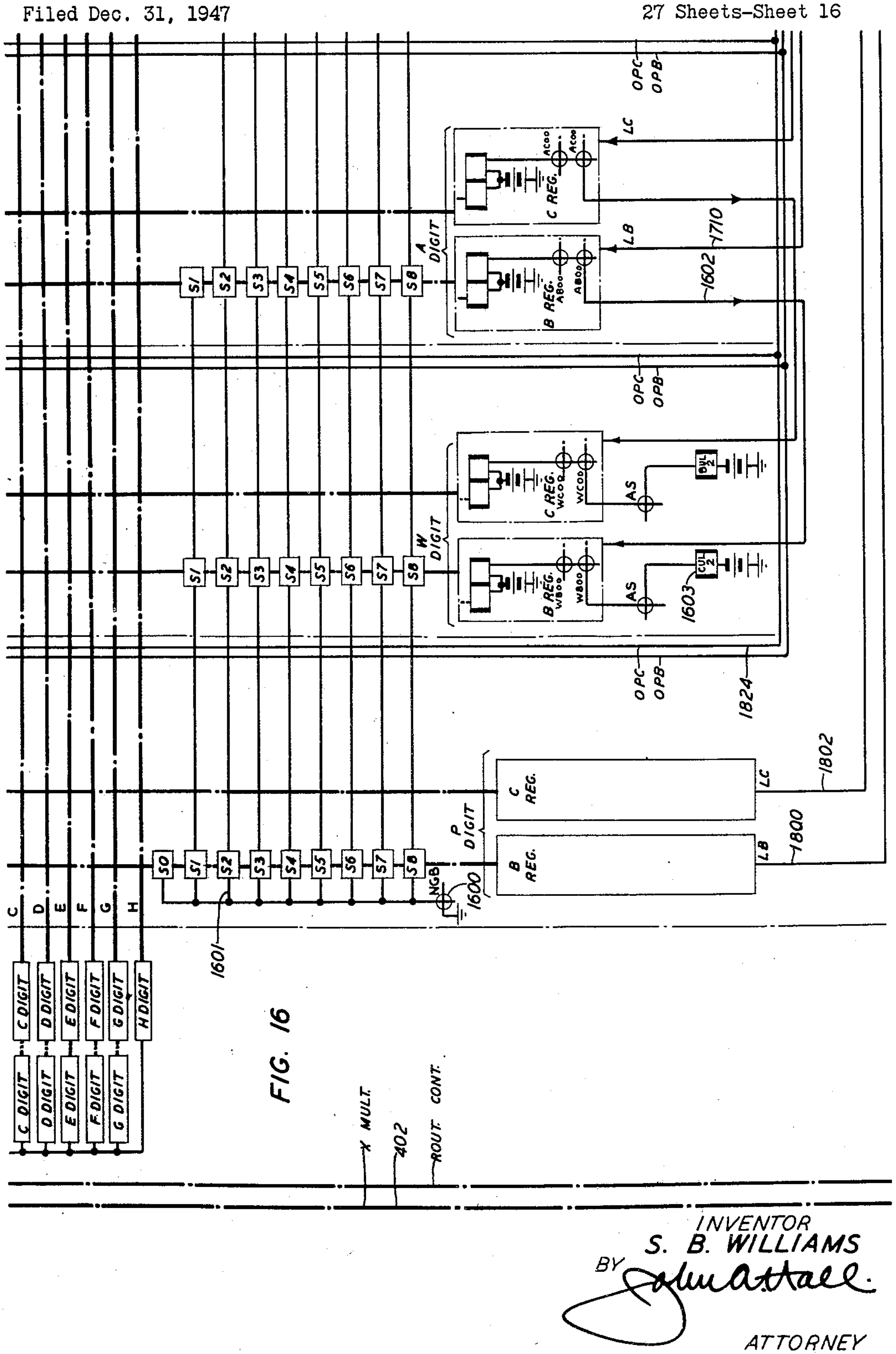
Figs. 16, 17 and 18 show the B and C registers of the calculator, Fig. 16 indicating the P, W and A digits, Fig. 17 showing in full the B digit and Fig. 18 indicating the C to H digits, inclusive.
Figure 17:
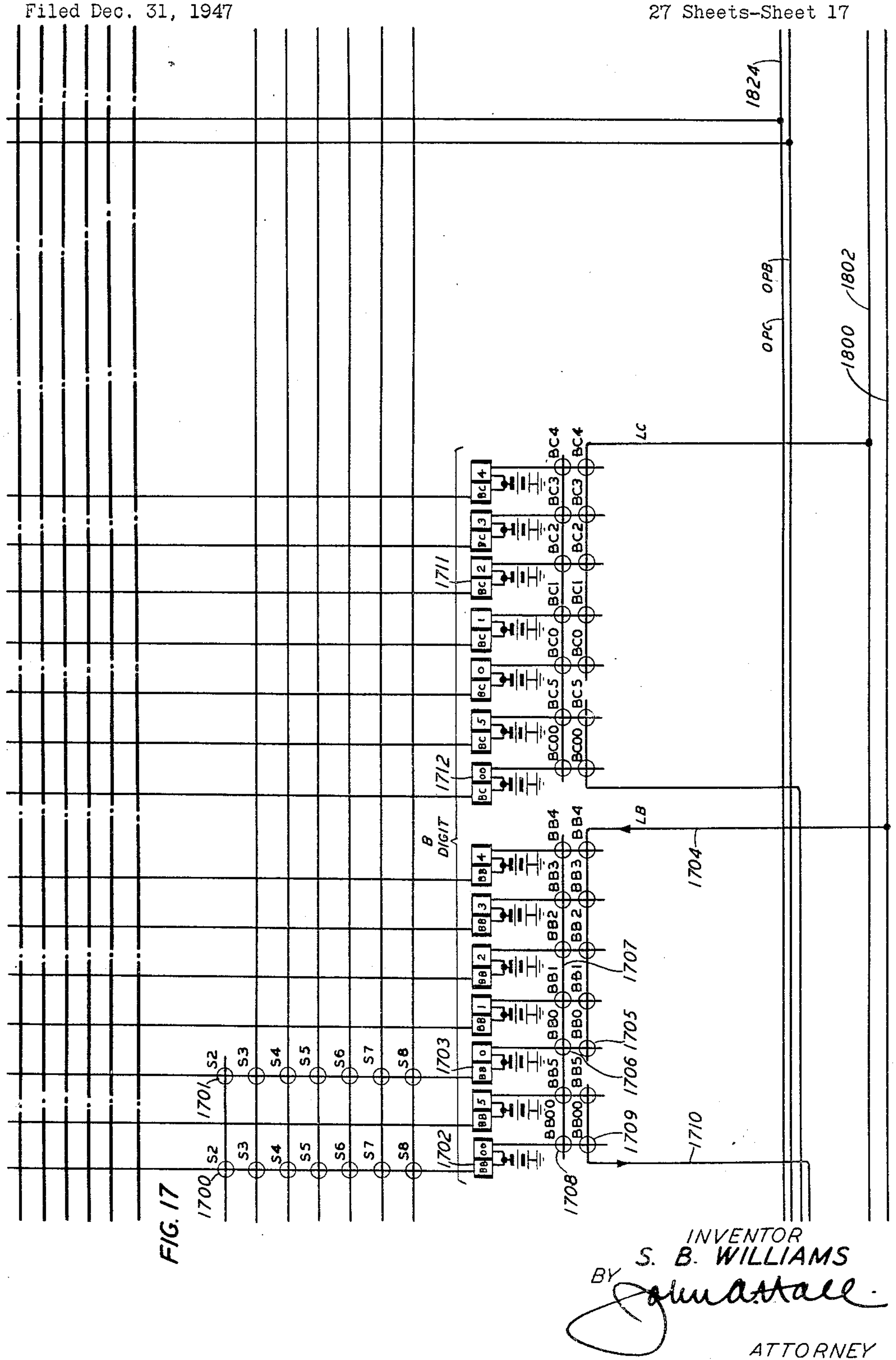
Figure 18:
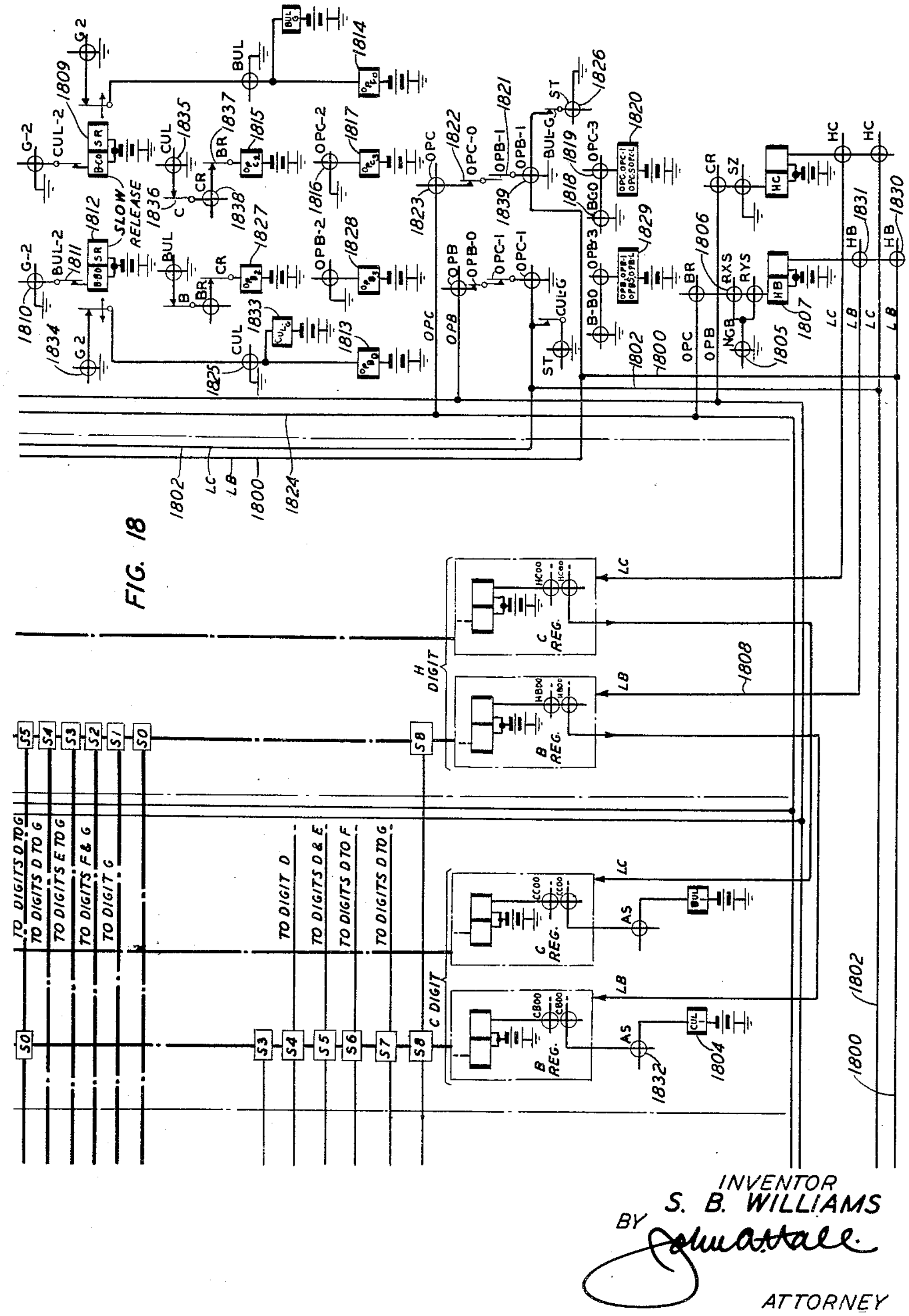
Figure 19:
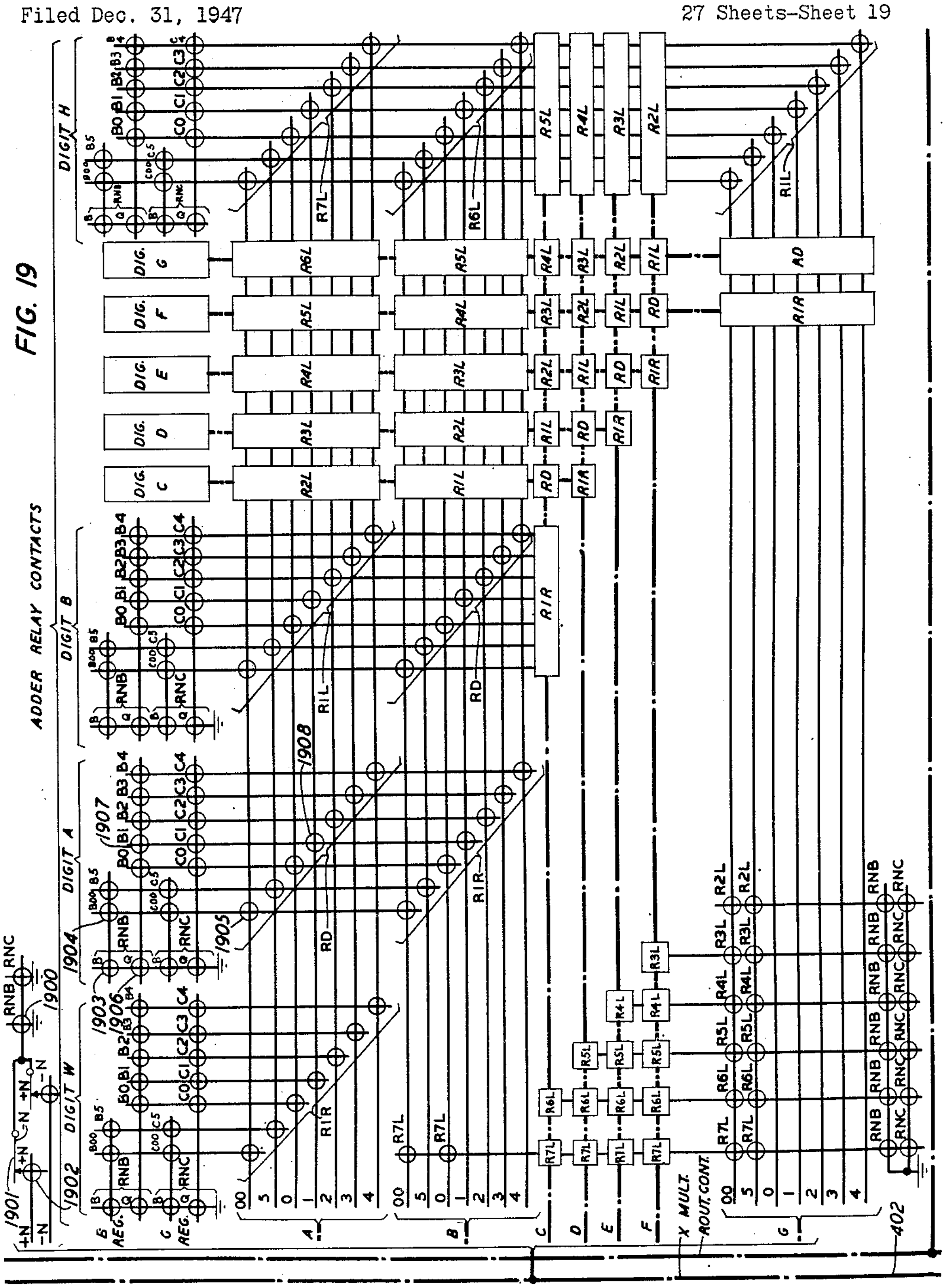
Fig. 19 shows the means for reading out from the sum relays together with the shift control.
Figure 20:
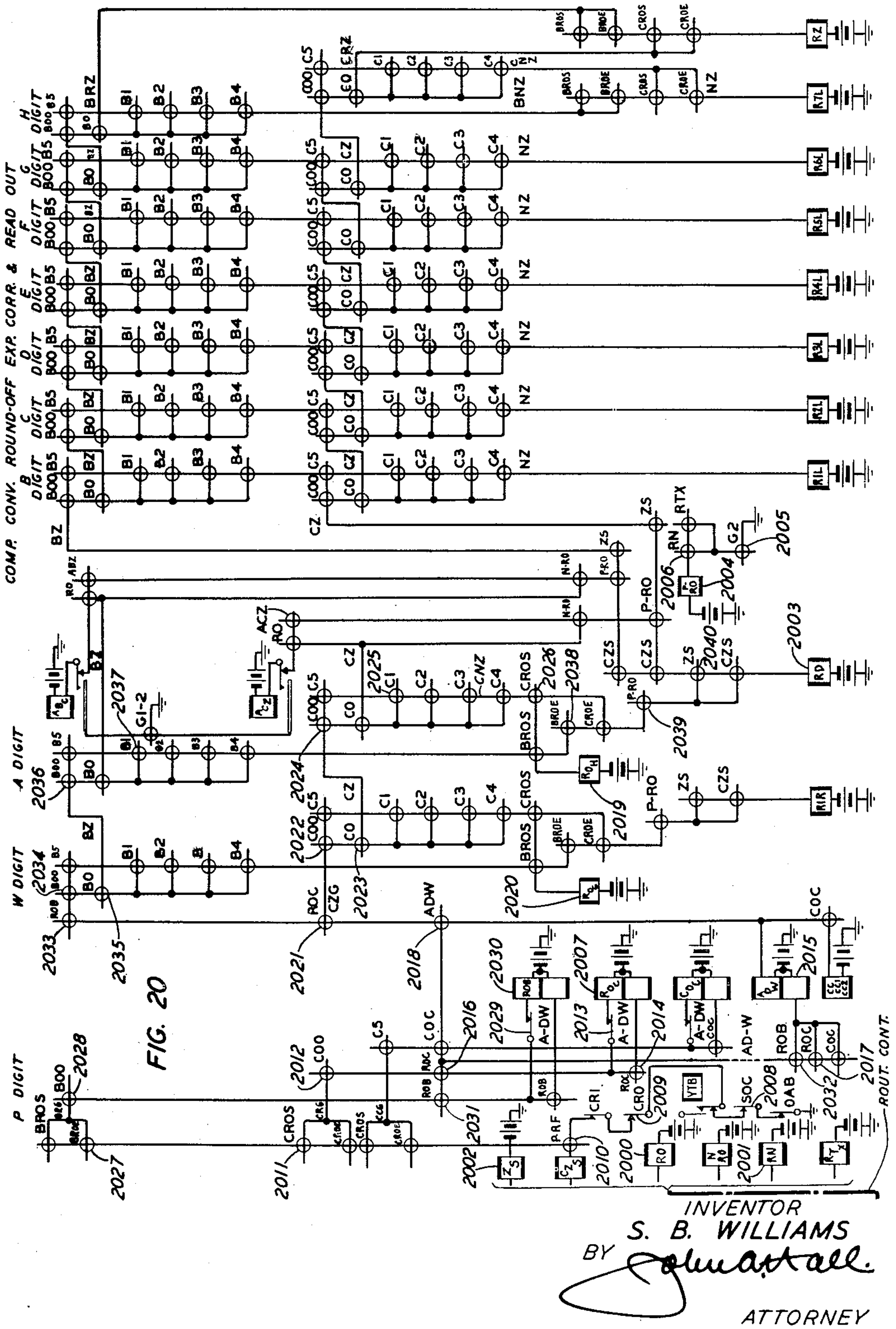
Fig. 20 shows the means for controlling the read-out relays.
Figure 21:
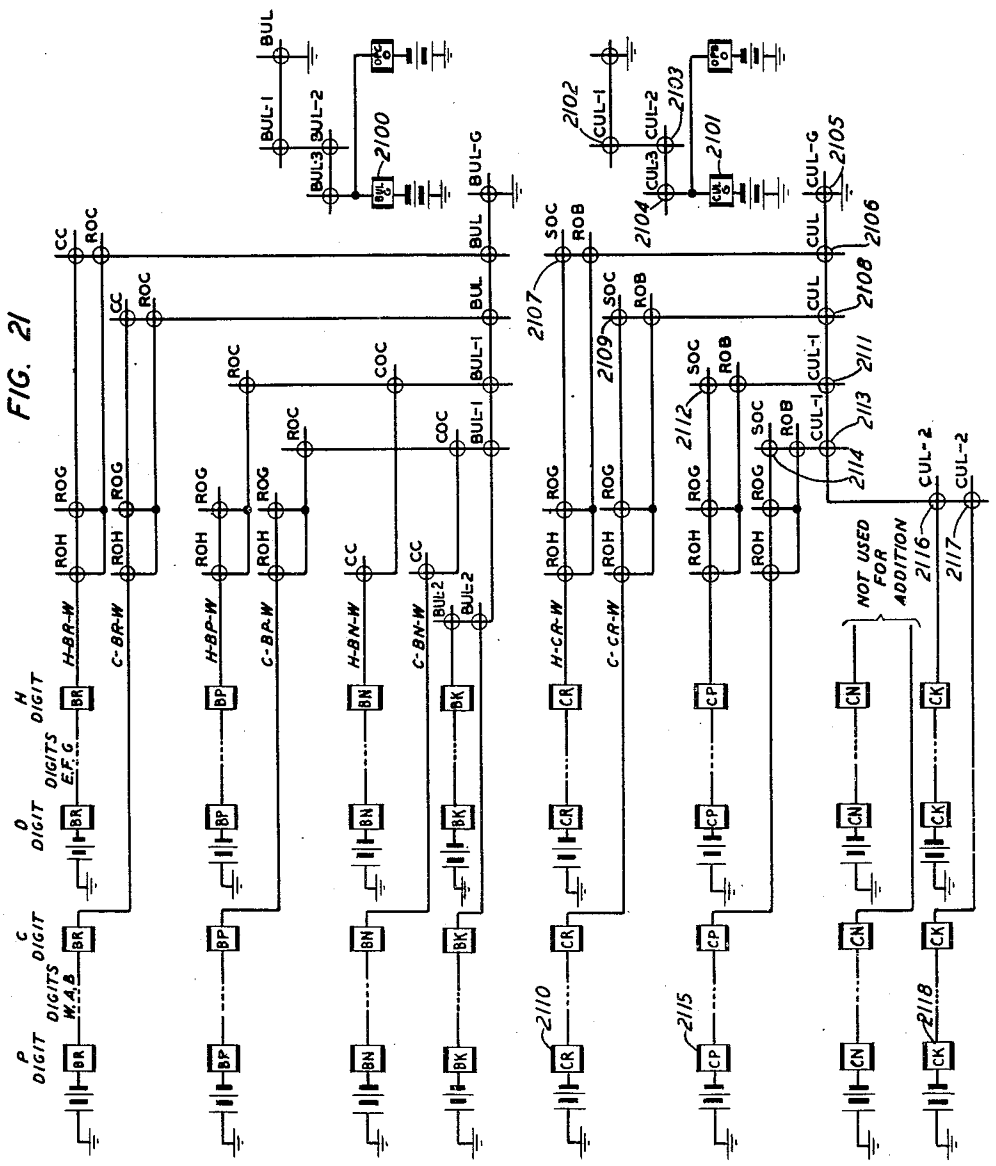
Fig. 21 shows the means for controlling the switching relays by means of which the quantities in the A and B registers are summed into the C register or alternatively the quantities in the A and C registers are summed into the B register.

The A relays are locked through the back contacts of the P—RF relay as indicated in one instance in Fig. 11 where the AP0 relay 1107 is shown locked through the AP0 contacts 1108 and the P—RF back contacts 1109 to ground. A similar circuit for every relay in the A register is provided so that now upon the operation of the P—RF relay in interval 24 the A relays release in interval 25.

At this point the ROC relay (round-off the value in the C register ) 2007 is operated in a circuit which may be traced from ground through the SOC back contacts 2008, the CR0 back contacts 2009, the P—RF contacts 2010, the CROS contacts 2011, the C00 contacts 2012, through the A—DW back contacts 2013 to the winding of the ROC relay 2007. It was hereinbefore described how the CROS relay 1513 operated in interval 19. It may be noted that the CROS relay is one which controls the start of the round-off of the value in the C relays and that this operation will continue through the operation of the BROE relay which controls the end of the round-off on the B relays. The C00 relay in the P digit is operated because we have assumed such values in the A and B registers that the sum on the C registers includes the value 0 in the P denominational place. Therefore, the ROC relay 2007 operates and immediately locks through its own contacts 2014. The operation of the ROC relay takes place in interval 26 and is followed in the next interval 27 by the operation of the A—DW relay 2015. The circuit for this may be traced from the ground supplied through the C00 contacts 2012, the ROC contacts 2016, thence through the down-check circuit of the A relays, the ROC contacts 2017 to the winding of the A—DW relay 2015. This relay now locks through the A—DW contacts 2018 to the ground supplied for the operation of the ROC relay independent of the down-check circuit of the A relays. The A—DW relay 2015 operates in interval 27.

This is followed by the operation of the ROH relay 2019. It may be noted that the ROH relay is one which controls the round-off operation within the H digit and this depends on the fact that there is a significant digit registered in the A digit or denominational order and that there is a 0 in the W and P digits. It may be of interest to note that similarly if a carry had occurred in the summing and that a significant digit had been registered in the W digit order, that then the round-off operation would take place within the G digit rather than the H digit and this would have been controlled by the ROG relay 2020. Since we have assumed that there will be no carry from the A to the W digit, then the ROH relay will be operated in a circuit from the ground supplied for the operation of the ROC relay through the ROC contacts 2016, the A—DW contacts 2018, the ROC contacts 2021, the C09 contacts 2022, the C0 contacts 2023, the C00 contacts of the A digit 2024, the C1 contacts of the A digit 2025 (the value 1 is registered in the A digit), the CROS contacts 2026 to the winding of the ROH relay 2019. The ROH relay operates in interval 28.

With the operation of the ROH relay, the relays are now automatically set to register the value 0 in each of the denominational orders except the H digit and in that to register the value 5. This is shown, for instance, on Fig. 12 where a circuit is extended from ground through the ROH contacts 1200 to the AH—5 relay 1201 and also through the ROH contacts 1202 to the AH0 relay 1203. Through the operation of the AH—5 relay and the AH0 relay the value 5 will be registered in this denominational order. In a similar manner a ground will be extended through the ROH contacts 1110 in Fig. 11 to the AP0 relay 1107 which registers 0 in this P denominational order. Again a ground is extended through the ROH contacts 1111 to the AW0 relay 1112 to register 0 in the W denominational order. In the B denominational order a ground is extended through the ROH contacts 1113 to the AB00 relay 1103 and through the ROH contacts 1114 to the AB0 relay 1115. In a similar manner, zeros will be registered in the A, C, D, E, F and G digits or denominational orders. Thus the A relays operate again in interval 29.

It has been hereinbefore described that during interval 22 the OPC—1 relay 1820 was released and that during interval 23 the OPB0 relay 1813 was released. Therefore, when the OPB relay 1829 is operated during interval 26 the OPB lead is grounded at the end of interval 26 and now upon the operation of the A relays in interval 29 is still grounded. Therefore, a ground will be extended through the P—RF contacts 1515 to the CC0 (carry in 0 for the operation of summing through the A and C relays into the B relays) so that the following sum may be taken:

```
 0000000005
 0012469126
          0
 ----------
 0012469131
```

Thus the B relays are operated again in the interval 30 and this as before causes the CUL relays to become operated in interval 31 followed by the operation of the CUL—G relay 1833 and the OPB0 relay 1813 in interval 32. At the end of interval 32 through the operation of the OPB0 relay the ground is removed from the OPB lead.

*Preparation for read out*

We may now trace the operation of the BROE relay 1516 through the ground placed on the OPB lead at the end of interval 26 through the ROC contacts 1517 to the winding of the BROE relay 1516 which thereupon operates during interval 27. Upon the operation of the CUL—G relay 1833 in interval 32 the ground is removed from the LC lead 1802 at the end of interval 32 so that the C relays and the BUL relays are released in interval 33. This is followed in interval 34 by the release of the BUL—G relay 2100. Also through the opening of the C relay contacts such as the C09 contacts 2022, the A—DW relay 2015, the ROC relay 2007 and the ROH relay 2019 will be released. The CROS relay 1513 which had locked to the LC conductor 1802, therefore, also releases in interval 33 since the ground is removed from the LC conductor 1802 at the end of interval 32.

Therefore, as soon as the A—DW relay becomes fully released a circuit is established from ground through the BROE contacts 2027, through the B00 contacts 2028, the A—DW back contacts 2029 to the winding of the ROB relay 2030 and

BEST AVAILABLE COP the ROB relay thus operates in the following interval 34. Since the ROH relay released in interval 34 the A relays are released in the following interval 35 so that at the end of this interval the A down-check circuit is closed through. Thus in interval 36 the A—DW relay will again be operated in a circuit from the ground through the B00 contacts 2028, through the ROB contacts 2031, the A down-check circuit, the ROB contacts 2032, the A—DW relay 2015 which thereupon operates and locks through its contacts 2018 and the ROB contacts 2031 to the ground supplied for the operation of the ROB relay 2030. In the following interval 37, therefore, the RD (read direct) relay 2003 is operated in a circuit from the ground supplied for locking the A—DW relay through the ROB contacts 2033, the B90 contacts 2034, the B0 contacts 2035, the B00 contacts of the A digit 2036, the B1 contacts of the A digit 2037 (the sum rounded off into the B relays contains a 1 in the A digit), the BROE contacts 2038 (closed in interval 27), the PR9 contacts 2039, the ZS contacts 2040 to the winding of the RD relay 2003. Hence, the RD relay for controlling the read-out of the number now registered in the B relays is operated in interval 37.

Let us now turn for a moment to Fig. 8. It will be remembered that the EA relays of the ancillary number calculator were reset during interval 21 and that, therefore, the EAUP relay 848 was operated in the following interval 22. The operation of the EAUP relay opens the locking circuit for the Z relays and hence the Z relays release during interval 23. Therefore, at the end of this interval a circuit is established through the down-check circuit of the Z relays for the operation of the COR relay 849 in interval 24, the COR relay locks through the G2—1 contacts 850 and will remain operated until the calculator is released. This relay now prepares a circuit for certain read-out relays for reading out the exponent sign and number but this cannot become effective until the Z relays have again been operated and the Z up-check circuit connected to the lower armature of the ST—2 relay 830 is closed. Therefore, we must look now to the means for making the correction in the ancillary number. The EA relays have been set to express the value 03 which was the exponent of the number entered into the Y register. To this is now added the correction caused by the shift of the first significant figure of the sum taken in the B registers. This shift, however, is zero since the first significant digit is now registered in the A digit of the B register and hence to the 03 in the EA relays a 00 will be added through the operation of the EB relays to express this last value. This is accomplished as follows: Upon the operation of the CR0 relay a circuit may be traced from ground through the COR contacts 757, the CORN back contacts 758, the CORP contacts 759, the SP contacts 760 to operate the CBD relay 761. The CORP contacts 759 are closed in interval 38 through the RD contacts 912 and hence the CBD relay is operated in interval 39. With the CBD relay and the RD relay operated, we will find that the EB relays are operated in the following interval 40. A circuit may be traced from ground through the RD contacts 518, the CBD contacts 519 to cause the operation of the EBT0 relay 520. Also a circuit may be traced from ground through the RD contacts 521, the CBD contacts 522 to cause the operation of the EB00 relay 523. Again, a connection may be traced from ground through the RD contacts 524, the CBD contacts 525 to cause the operation of the EB3 relay 526. With the EBT0 relay 520, the EB30 relay 523 and the EB3 relay 526 operated the value 00 will be expressed in the augend means of the ancillary number calculator. Therefore, the sum will be taken into the Z register as follows:

A ground may be traced through the EB0 contacts 615, the EA—3 contacts 616, the EB00 contacts 617, the EA00 contacts 608 to cause the operation of the Z00 relay 609. A circuit may also be traced from ground through the CBD contacts 618, the EB3 contacts 619, the EA—3 contacts 620, the Z3 relay 621 whereby this relay becomes operated. Again, a circuit may be traced from ground through the EB00 contacts 622, the EA00 contacts 623, the EBT0 contacts 624, the EAT0 contacts 625 to cause the operation of the TS0 relay 626. The Z00, the Z3 and the TS0 relays, therefore, operate in interval 41.

Upon the operation of the TS0 relay in interval 41 a circuit is closed through the COR contacts 627, the TS0 contacts 628 to operate the ZT0 relay 629 in interval 42.

*Read out of exponent*

We may now look at the operation of the exponent read-out relays in Fig. 9. Upon the operation of the TS0 relay a circuit is closed from ground through the SP contacts 908, the CBD contacts 909, the TS0 contacts 910 to cause the operation of the REP relay 911 in interval 42.

Since the Z relays have operated in interval 41, then at the end of this interval the Z up-check circuit will be closed and this will be extended through the lower contact and armature of the COR relay through the RN contacts 913, the RTX back contacts 914, the RCS contacts 915 and in one direction through the RE relay 916 and in the other direction through the BROE contacts 917 to the RNB relay 918. Thus the RE relay 916 and the RNB relay 918 operate in interval 42. Upon the operation of the RE and REP relays a ground is extended over the REN back contacts 919, the REP contacts 920, the RE contacts 921 to the +E wire leading to the X multiple and from there to the printer register in accordance with the arrangements made by the routine control circuit. Another circuit may be traced from ground through the ZT0 contacts 922, the RE contacts 923 to the ET0 wire leading to the printer register. Another circuit may be traced from ground through the COR contacts 924, the TS0 contacts 925, the Z3 contacts 926, the RE contacts 927 to the EU—3 wire leading to the printer register and lastly a circuit may be traced from ground through the COR contacts 924, the TS0 contacts 928, the Z00 contacts 929, the RE contacts 930 to the EU00 wire leading to the printer register. Thus the wires of this part of the transmission trunk will be grounded to represent the value +03. Since the printer register has previously been connected to the trunk it follows that this value +03 will be registered as the exponent therein during interval 43 (following the operation of the relay RE).

*Read out of significant digits*

Upon the operation of the RNB relay in interval 42 the number summed and rounded off into the B register will be transmitted in like manner to the printer register. This may be seen from Fig. 19 where firstly a circuit may be traced from ground, the RNB contacts 1900, the +N back contacts 1901, the +N contacts 1902 to the +N conductor thus registering in the printer register the fact that the number will be positive. Since the W digit in the B register is zero, and the first significant figure appears in the A digit, so that no shift is required and the RD (read direct) relay has been operated, the W digit is not transmitted to the printer register. The number in the A digit, however, will be transmitted through circuits from ground, the RNB contacts 1903, the B00 contacts 1904, the RD contacts 1905 to the 00 lead going into the A digit of the printer register. Similarly, a ground is extended over the RNB contacts 1906, the B1 contacts 1907, the RD contacts 1908 to the 1 lead going into the A digit of the printer register. Thus the first significant digit 1 registered in the B register of the calculator is transferred to the A digit place in the printer register. In a similar manner the remaining six significant digits will be transferred but the value in the H digit will not be transmitted. It is believed that the pattern of these operations will be perfectly clear from the arrangement of the relay contacts and the rectangles representing other such contacts in Fig. 19.

It need now be pointed out that as soon as the upcheck circuits of the printer register have been closed thus proving that the transfer through the read-out relays of the calculator have been completed a signal will be given to the routine control circuit notifying it in effect that the calculator has completed its duties and may now be dismissed. Allowing three intervals here, merely by way of example, to indicate that certain operations take place in the routine control circuit the operation of dismissing the calculator will start in interval 46 and will first consist in the dropping off of those relays particularly controlled by the routine control circuit such as the ADD, ZS, RO, ST, G1—2, G2, G2—1 and the AS relays. These relays, therefore, release in interval 46. Certain other relays directly depending upon these such as the EX, EY, X and Y relays of the calculator registers will, therefore, release in the next interval 47. Other relays such as the relay YLN which depend upon the exponent register relays will release in interval 48 and there are a few such as EAUP which will release in interval 49 so that by the end of interval 49 the calculator will be completely restored to normal.

*Preparation of printer registers*

It has hereinbefore been noted that after the first part of the routine order FC+GH= has been carried out, that is, that the value in the F register has been transmitted over the X multiple and registered within the calculator and the value in the G register has been transmitted over the Y multiple and registered within the calculator that a signal signifying the fact that these values have been completely registered in the calculator is sent back to the routine control circuit and results in the operation of the RN relay in interval 10. This clears the way for the carrying out of the last part of the routine order QPFKH$\overline{\text{EO}}$ which means that the result attained in the calculator will now be transmitted from the calculator over the X multiple to the printing circuit. Since the relay RN cannot operate until the X multiple has been cleared, the start toward the carrying out of this last part of the order will not occur until that time. Therefore, on the sequence chart in interval 11 certain relays in the printer circuit (Fig. 22) are shown as operating. This, of course, is in time considerably before the operation of these relays is needed but they nevertheless are operated in preparation for the following operations. Therefore, in interval 11 the cut-in relays are operated in order to connect the printer registers to the conductors of the X multiple. By way of example, the NR relay 2200 will connect the sign of number relays such as +N 2201 and +E 2202 to the corresponding conductors of the X multiple. Through the use of similar relays such as the EUR relay 2203, the AR relay 2204, the BR relay 2232, etc., the various register relays are connected to the X multiple. At the same time certain other controlling relays are also operated by the routine control circuit. In the present case the S± relay 2205 is operated to control the printing of the sign of the result. The NS relay 2206 would have caused the opposite effect and is not operated in this case. The SP5 relay 2207 is one of a number of similar relays, one of which is always operated. In the present case the SP5 relay 2207 is operated to control the transmission to the printer of five spacing signals following the printing of the number.

Again, and at this interval 11 the D register is operated in accordance with the code letter H in the printing order which specifies that the decimal point will be invariably in the eighth place of the eleven places provided for printing. Since the value of these places is based on the succession of the numbers starting with zero, the eighth place will have a value of seven and hence the D5 relay 2208 and the D2 relay 2209 will be operated. This condition will prepare the printing circuit for operation when and if the number is transferred to the registers shown in the upper part of Fig. 22.

Later and as shown in the sequence chart the S register will be operated in interval 44. It will be realized that since the read-out relays RNB, RE, etc. have been operated in interval 42 that the register relays of Fig. 22 will be operated in interval 43 and that, therefore, the S register will be operated in interval 44. Since we have assumed that the result of the calculation is a number whose sign is plus, whose exponent sign is plus, whose exponent value is 03 and whose value is 1246913, it will be found that the ET0 relay 2210, the EU00 relay 2211 and the EU—3 relay 2212 are operated. Therefore, a circuit will be established from ground through the ET0 contacts 2213, the +E contacts 2214, the +EU00 contacts 2215 to result in the operation of the S00 relay 2216. At the same time, a circuit is established from ground through the ET0 contacts 2213, the +E contacts 2217, the +EU—3 contacts 2218 to cause the operation of the S3 contacts 2219. With these relays operated then a circuit may be traced from ground through the D5 contacts 2300, the S00 contacts 2301, the D2 contacts 2302, the S3 contacts 2303 to cause the operation of the 4S relay 2304. The 4S relay will close a number of contacts to connect the steering chain conductors to a transmission trunk for causing the proper sequence of printed characters.

*Start of sequential transmission of characters to printer*

It may now be noted that a circuit is established from ground through the S± contacts 2220 over a chain including the back contacts of the steering chain relays starting with the EP relay 2221 and reaching through the back contacts of the CH—1 relay 2222, thence through the S± contacts 2223 to cause the operation of the SN relay 2224. It may be noted as an interesting point that had the SN relay instead of the S± relay been operated, then the first relay in the chain to become operated would have been the CH—1 relay 2222 instead of the SN relay 2224.

A ground is placed by the routine control circuit also on the STG conductor 2225 and this conductor extending into Fig. 25 will extend a ground through the RC—1 contacts 2501 to cause the operation of the RGN relay 2500. The RGN relay (register number) will control the stepping circuit and the operation of the printer number register. Upon the operation of the SN relay 2224 the ground on the STG conductor 2225 is connected by armature 1 and front contacts of the SN relay 2224 to a chain circuit extending through the armature and back contacts of the remaining chain relays to the ST conductor 2226 which extends into Fig. 25 and causes the operation of the CD relay 2502. This relay functions to connect the downcheck circuit of the printer number register to the ST relay 2503 through the CD contacts 2504 so that if the printer number register shown in the upper part of Fig. 25 is ready for operation the printing operation will start.

It may be noted that the ST relay 2503 operates as the usual start relay for the printing telegraph distributor used for sequentially sending out impulses to a printing telegraph device in accordance with the electrical characterization of the conventional five segments thereon. Also the STP relay 2505 will operate to cause the advance of the steering chain.

Upon the operation of the SN relay a circuit is closed through the down-check circuit of the printer number register, armature 4 and front contacts of the SN relay 2224 over conductor 2227, through the +N contacts 2506 to cause the operation of the DC+ relay 2507. This relay operates and connects the ground transmitted over conductor 2227 through the DC+ contacts 2508 and DC+ contacts 2509 to the first and fourth code conductors, respectively. It may also be noted that the ground transmitted over conductor 2225 also extended through the down-check circuit of the printer number register to cause the operation of the RDC relay 2510 and this relay now establishes a circuit from ground through the DC+ contacts 2511, the RDC contacts 2512, the ST contacts 2513 to the RC—1 relay 2514. Therefore, the ground extended over conductor 2227 will cause the operation of the R1 relay 2515 and the R4 relay 2516 so that during the ensuing rotation of the printing telegraph distributor the electrical characterization of the first and fourth conductors through the RGN contacts 2517 will cause the transmission of a code consisting of a mark signal in the first and fourth places and a space signal in each of the second, third and fifth places to cause the printing of a + sign in the conventional manner. Due to the operation of the R1 and R4 relays a circuit is established from ground through the RGN contacts 2518 and the R1 contacts 2519 and the R4 contacts 2520 through the RDC contacts 2521 to cause the operation of the STP relay 2505. The effect of this will be found in the chain circuit where the ground for the operation of the SN relay is now extended over the front contact and armature 2 of the SN relay 2224, the STP contacts 2228, the armature 3 and front contact of the SN relay 2224 to the CH—1 relay 2222. The CH—1 relay in operating opens the circuit for the SN relay and allows it to release. When the SN relay is fully released, the character 1 conductor 2229 is grounded through the armature 4 and back contact of the SN relay 2224 and the armature 6 and front contact of the CH—1 relay 2222. The ground on conductor 2229 is now extended over the 4S contact 2305 to cause the operation of the SPA relay 2307. During the operation of the CH—1 relay 2222 and before the SN relay 2224 has become released the ground is removed from the start conductor 2226 so as to allow the ST relay 2503 to operate. When the SN relay 2224, however, has become fully released the ground on the STG conductor 2225 is extended over armature 1 and back contact of the SN relay 2224, armature 1 and front contact of the CH—1 relay 2222 to again place ground on the ST conductor 2226 to start another operation of the transmitter-distributor of the printing telegraph apparatus. The operation of the SPA relay 2307 will result in the establishment of a circuit from ground through the SPA contacts 2522 and the consequent operation of the R3 relay 2523 so that in this instance a code consisting of two space signals, a mark signal and two more space signals will be transmitted to the recording means 2524.

In this manner the steering chain will cause the operation of the printer to extend through eleven characters by the sequential operation of the CH—1 relay 2222 to the CH—11 relay 2230 thus sequentially grounding the eleven character conductors leading from these relays. Through the pattern of connections established by the 4S relay 2304 it will be noted that after the positive sign has been printed that four spacing signals will be sent to the printing telegraph apparatus and that thereafter the first significant digit will be transmitted when the No. 5 character conductor is grounded so as to extend the ground through the 4S contacts 2336. The ground on this conductor will now extend into Fig. 24 where it will be further switched by the $10^3$ relay 2400. This relay is operated through a circuit from ground, the +E contacts 2401, the S00 contacts 2402 and the S3 contacts 2403 so that the ground coming over the No. 5 character conductor will now be extended over the $10^3$ contacts 2404 to cause the operation of the A relay 2525. This A relay will operate to close a contact which will transfer the registration in the A digit register 2231 to the printer number register. Thus a ground is extended through the A contacts 2526, the A00 contacts 2527 to operate the P00 relay 2528. A ground is likewise extended through the A contacts 2529, the A1 contacts 2530 to cause the operation of the P1 relay 2531. Thus the digit 1 is registered in the printer number register and this will cause the operation of the R1 relay 2515, the R2 relay 2532 and the R4 relay 2516 so that a code consisting of two mark signals, a space signal, a mark signal and a final space signal will be sent to cause the printer to print the digit 1.

In a similar manner the other digits of the result attained in the calculator will be printed. It need only be noted here that the pattern set up by the $10^3$ relay 2400 is such that after the first three digits have been printed then upon the grounding of the eighth character conductor the ground will be extended through the $10^3$ contacts 2405 to ground the decimal point conductor 2406 which will extend a ground through the DC+ contacts 2533 to cause the operation of the R2 relay 2532 and the DC+ contacts 2534 to cause the operation of the R3 relay 2523 thus causing the transmission of a code consisting of one space signal, followed by two mark signals, followed in turn by two space signal to cause the printing of the decimal point. It is believed to be clear from the pattern of contacts closed in Figs. 23 and 24 that the number will be printed finally as a + sign, followed by four spaces, followed by the digits 124, followed by the decimal point, followed by the digits 691 and then followed by five spacing signals.

*The format of the printed results*

In order to indicate the capabilities of the device and the control which the exponent value exercises over the printing operation, the following table has been prepared. In the first column are shown a number of numbers to be printed, that is, numbers which may be registered in the register shown in the upper part of Fig. 22. The second, third and fourth columns are shown merely by way of example in order to illustrate what would happen under various routine order conditions. In the second column will be the routine order FKH which, as explained hereinbefore, will direct that the sign of the number be printed and that five spaces be provided after the number before the number directed by some other routine order is to be printed. The K provides that eleven spaces will be made available for the printing of the number and the decimal point and all spaces not filled with some digit after the first significant digit is printed will be filled out with zeros. The letter H directs that the decimal point be placed invariably in the eighth space. In the second column the printing order CGG directs that the sign of the number be printed and that two spaces be provided after the number. The first G directs that seven spaces be provided for the number and the decimal point and the last G provides that the decimal point be invariably placed in the seventh space. The third column where the code DCB is used, such code directs that the sign of the number be printed and that three spaces be provided after the number. The C directs that three spaces shall be provided for printing the number and the decimal point and the B provides that the decimal point shall always be placed in the second position.

It should be particularly noted that these examples are given merely to show the capability of the device and it is particularly pointed out that the operator will choose a routine order which will produce a uniform result rather than the very scattered result shown in the following table. In actual practice and in the use of this calculator the number of digits printed before the decimal point is generally uniform or actually varies over a small range so that great columns of figures are produced which are more or less uniform in appearance. The mathematician who plans the use of the device will, therefore, pick out and establish a routine order which will most nearly fit the expected results.

It may be noted on the first line of the following table where the number +1234567+08 or larger is noted that in each case in the other columns the word "alarm" has been put in. This indicates that where the number is too large for the spaces allotted, the attempt of the device to print such a number will only result in the giving of an alarm. Toward the lower end of the table where the number to be printed is indicated as +1234567−03 or smaller the number is such that no one of its digits becomes printed. In the second column under the routine order CGG the decimal point which is directed to be in the last of the seven spaces provided is always printed but this is an expedient for the help of the maintenance of personnel in tracing an error in operation or planning and is an operation with which we need not be here greatly concerned.

| Number to be printed | Routine Orders | | |
|---|---|---|---|
| | FKH | CGG | DCB |
| +1234567+08 or larger | Alarm | Alarm | Alarm |
| +1234567+07 | +1234567.000 | Alarm | Alarm |
| +1234567+06 | +123456.700 | +123456. | Alarm |
| +1234567+05 | +12345.670 | +12345. | Alarm |
| +1234567+04 | +1234.567 | +1234. | Alarm |
| +1234567+03 | +123.456 | +123. | Alarm |
| +1234567+02 | +12.345 | +12. | Alarm |
| +1234567+01 | +1.234 | +1. | +1.2 |
| +1234567+00 | +.123 | +. | +.1 |
| +1234567−01 | +.012 | +. | +.0 |
| +1234567−02 | +.001 | +. | +.0 |
| +1234567−03 or smaller | +.000 | +. | +.0 |

It now only need be noted that when the SP—5 relay has completed its function that the stepping circuit will finally cause the EP (end of printing) relay 2221 to be operated. This will close certain contacts so that a circuit will be established from the STG conductor through the EP contacts 2535 to cause the operation of the LK relay 2536. The LK relay as its designation implies controls a locking circuit for the register relays shown in the upper part of Fig. 22. This locking circuit is shown schematically by the contacts controlled by the LK relay 2536 so that upon the operation of this relay the locking circuit will be broken and the register relays will be returned to normal. This will give a signal to the routine control circuit that its order has been completely carried out and hence the grounds to the various relays will be removed so that the printing circuit may be returned to normal.

Thus it will be seen that the value of the exponent or ancillary number accompanying each number transmitted from place to place in the computer system will have a controlling function in the various operations therein.

What is claimed is:

1. In a computer system for calculating with decimal numbers having a wide range of values with respect to the decimal point, significant digit registers each having a plurality of decimal denominational orders limited in number to less than the number of orders comprehended in said wide range of values for registering a given number of significant digits of a number and associated with each said significant digit register, an ancillary number register having a plurality of decimal denominational orders for registering an ancillary number representing information comprehending the location of the decimal point with respect to said significant digits, and a column shifting means for controlling the entry of the significant digits of a number into one of said significant digit registers controlled by said ancillary number registers.

2. In a computer system for calculating with decimal numbers having a wide range of values with respect to the decimal point, an adder having augend, addend and sum registers, each said register having a plurality of decimal denominational orders limited in number to less than the number of orders comprehended in said wide range of values for registering a given number of significant digits of a number and associated with

BEST AVAILABLE COP each of said augend, addend and sum significant digit registers, an ancillary number register having a plurality of decimal denominational orders for registering an ancillary number representing information comprehending the location of the decimal point with respect to said significant digits, and a column shifting means for determining in which of the said decimal denominational orders of one of said significant digit registers the significant digits of a number shall be registered, said column shifting means being controlled by said ancillary number sum register 3. In a computer system for calculating with decimal numbers having a wide range of values with respect to the decimal point, comprising significant digit registers each having a plurality of decimal denominational orders limited in number to the number of significant digits required for a desired degree of accuracy in a calculation for registering the significant digits of a number without regard to the decimal point, an ancillary number register associated with each said significant digit number having a plurality of decimal denominational orders for registering an ancillary number representing information comprehending the location of the decimal point with respect to the said decimal denominational orders of said significant digit registers, and a means controlled jointly by the said ancillary number registers associated respectively with a pair of said significant digit registers to cause the significant digits of one number to be entered into one of said significant digit registers in columnar alignment with the digits in the other one of said significant digit registers.

4. In a computer system for calculating with decimal numbers having a wide range of values with respect to the decimal point, registers each having a plurality of decimal denominational orders limited in number to the number of significant digits required for a desired degree of accuracy in calculation for registering a compound number consisting of the significant digits of a number and a multidigit code representing information comprehending the location of the decimal point with respect to said significant digits, a calculator accessible to said registers having augend, addend and sum registers, an input path for significant digit denominational orders of said augend register, a shifting means in said augend path and control means operated by said code denominational orders of said sum register for operating said shifting means.

5. In a computer system for calculating with decimal numbers having a wide range of values with respect to the decimal point, registers each having a plurality of decimal denominational orders limited in number to the number of significant digits required for a desired degree of accuracy in calculation for registering a compound number consisting of the significant digits of a number and a multidigit code representing information comprehending the location of the decimal point with respect to said significant digits, trunks for transferring register operating digit manifestations to and from said registers, a calculator accessible to said registers over said trunks, said calculator having augend, addend and sum means each consisting of a significant digit register, an ancillary calculator also accessible to said registers over said trunks, said ancillary calculator having augend, addend and sum means each consisting of a multidigit code register, a selective means responsive to said ancillary calculator for selectively interconnecting said trunks and the said registers of said calculator whereby the algebraically larger of two of said compound numbers may be entered in the said addend register of said calculator and the other of said two numbers may be entered in the said augend register of said calculator and column shift means controlled by said ancillary calculator interposed between said trunks and said augend register of said calculator whereby the significant digits of numbers entered into said addend and said augend registers of said calculator may be correlated in their columnar positions.

6. In a computer system for calculating with decimal numbers having a wide range of values with respect to the decimal point, registers each having a plurality of decimal denominational orders limited in number to the number of significant digits required for a desired degree of accuracy in calculation for registering a compound number consisting of the significant digits of a number and a multidigit code representing information comprehending the location of the decimal point with respect to said significant digits, a plurality of trunks for transferring register operating digit manifestations to and from said registers, connectors for interconnecting said trunks and said registers, a calculator accessible to said registers over said trunks, said calculator having addend, augend and sum means each consisting of a significant digit register, a multidigit code comparing means for determining which of two multidigit codes of two numbers to be entered into said calculator is algebraically the larger, said ancillary number comparing means consisting of two multidigit code registers and a result means jointly responsive thereto, said connectors for connecting said trunks to said addend and augend significant digit calculator registers being responsive to said result means, an ancillary calculator consisting of addend, augend and sum element, multidigit code registers and column shift means responsive to the said sum register of said ancillary calculator interposed between said trunks and said augend significant digit calculator register whereby the significant digits entered into said addend and said augend calculator registers may be correlated in their columnar relationship.

7. In a computer system for calculating with decimal numbers having a wide range of values with respect to the decimal point, registers each having a plurality of decimal denominational orders limited in number to the number of significant digits required for a desired degree of accuracy in calculation for registering a compound number consisting of the significant digits of a number and a multidigit code representing information comprehending the location of the decimal point with respect to said significant digits and the algebraic sign thereof, trunks for transferring register operating digit manifestations to and from said registers, connectors for interconnecting said trunks and said registers, a calculator accessible to said registers over said trunks, said calculator having augend, addend and sum means each consisting of a significant digit register, a multidigit code comparing means for determining which of two codes of two numbers is algebraically the larger, said comparing means consisting of two multidigit code registers and a result means jointly responsive thereto; an ancillary calculator consisting of addend, augend and sum element multidigit code registers for determining the number of denominational orders, by which the smaller of two numbers must be shifted in order to bring it into columnar correlation with the larger of said two numbers, column shift means associated with said augend significant digit calculator registers controlled by said sum elements of said ancillary calculator and connectors for connecting said trunks to said significant digit calculator registers controlled by said result means of said multidigit code comparing means.

8. In a computer system for calculating with decimal numbers having a wide range of values with respect to the decimal point, registers each having a plurality of decimal denominational orders limited in number to the number of significant digits required for a desired degree of accuracy in calculation for registering a compound number consisting of the significant digits of a number and an ancillary number comprising a multidigit code representing information comprehending the location of the decimal point with respect to said significant digits and the algebraic sign of the said number, trunks for transferring register operating digit manifestations to and from said registers, a calculator accessible to said registers over said trunks, said calculator including a register accessible to a first of said trunks for temporarily registering the significant digits and the multidigit code of a first number, a register accessible to a second of said trunks for temporarily registering the significant digits and the multidigit code of a second number, steering means jointly controlled by said two multidigit code registers, addend, augend and sum registers each consisting of a significant digit register and a multidigit code register, the said addend and augend significant digit registers being selectively accessible to said first number and second number significant digit registers, said addend and said augend multidigit registers being in like manner accessible to said code registers of said first number and said second number registers, connectors for interconnecting said first number and said second number registers and said addend and augend registers, said connectors being responsive to said result means, and column shift means associated with said augend significant digit calculator register, said column shift means being controlled by said sum means of said ancillary calculator.

9. In a computer system for calculating with decimal numbers having a wide range of values with respect to the decimal point, registers each having a plurality of decimal denominational orders limited in number to the number of significant digits required for a desired degree of accuracy in calculation for registering a compound number consisting of the significant digits of a number and an ancillary number consisting of a multidigit code representing information comprehending the location of the decimal point with respect to said significant digits and the algebraic sign thereof, trunks for transferring register operating digit manifestations to and from said registers, a calculator accessible to said registers over said trunks, connectors for interconnecting said registers and said trunks, said calculator having augend, addend and sum means each consisting of a significant digit register and an ancillary calculator having augend, addend and sum means each consisting of a multidigit code register, column shift means associated with said augend significant digit calculator register controlled by said sum element of said ancillary calculator and connectors for connecting said significant digit sum register and said multidigit code sum register to one of said trunks for transmitting from said calculator register operating digit manifestations representing the result of a calculator.

SAMUEL B. WILLIAMS.

REFERENCES CITED

The following references are of record in the file of this patent:

UNITED STATES PATENTS

| Number | Name | Date |
|---|---|---|
| 2,141,597 | Cunningham | Dec. 27, 1938 |
| 2,141,598 | Bryce | Dec. 27, 1938 |
| 2,262,235 | Hofgaard | Nov. 11, 1941 |
| 2,344,885 | Kozma et al. | Mar. 21, 1944 |